(12) United States Patent
Kitamura et al.

(10) Patent No.: US 11,167,867 B2
(45) Date of Patent: Nov. 9, 2021

(54) ARTIFICIAL SATELLITE, ATTITUDE CONTROL SYSTEM, AND ATTITUDE CONTROL METHOD

(71) Applicant: Mitsubishi Electric Corporation, Chiyoda-ku (JP)

(72) Inventors: Kenji Kitamura, Chiyoda-ku (JP); Takeya Shima, Chiyoda-ku (JP); Katsuhiko Yamada, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 344 days.

(21) Appl. No.: 16/329,012

(22) PCT Filed: Sep. 5, 2017

(86) PCT No.: PCT/JP2017/031955
§ 371 (c)(1),
(2) Date: Feb. 27, 2019

(87) PCT Pub. No.: WO2018/047817
PCT Pub. Date: Mar. 15, 2018

(65) Prior Publication Data
US 2019/0202582 A1 Jul. 4, 2019

(30) Foreign Application Priority Data
Sep. 9, 2016 (JP) .............................. JP2016-176346

(51) Int. Cl.
*B64G 1/28* (2006.01)
*G01C 19/02* (2006.01)
(Continued)

(52) U.S. Cl.
CPC .............. *B64G 1/286* (2013.01); *B64G 1/10* (2013.01); *B64G 1/36* (2013.01); *B64G 3/00* (2013.01);
(Continued)

(58) Field of Classification Search
CPC . B64G 1/286; B64G 1/10; B64G 1/36; B64G 3/00; B64G 2001/245; G01C 19/02
See application file for complete search history.

(56) References Cited

U.S. PATENT DOCUMENTS 3,489,373 A * 1/1970 Parilla .................... F42B 10/665
244/3.15
3,806,064 A * 4/1974 Parilla ....................... F02K 9/86
244/3.22
(Continued)

FOREIGN PATENT DOCUMENTS

DE 19737592 A1 * 3/1998 ............. B64G 1/361
EP 2 022 718 A1 2/2009
(Continued)

OTHER PUBLICATIONS

The Lunar Hopping Transporter _19730007490, Final Report (stanford Univ.) by R.Degner, M.Kaplan, J. Manning, R. Meetin, S. Pasternack, S.Peterson, H.Seifert, (NASA-CR-130010) Final Report for National Aeronautics and Space Administration Grant No. NGR,05-020-258 , Jul. 1971 (Year: 1971).*
(Continued)

*Primary Examiner* — Behrang Badii
*Assistant Examiner* — Jalal C Coduroglu
(74) *Attorney, Agent, or Firm* — Xsensus LLP

(57) ABSTRACT

When calculating a gimbal angle trajectory that satisfies boundary conditions set by an attitude boundary condition setter 2131 of the ground station 21, a gimbal angle trajectory calculator 2132 calculates the gimbal angle trajectory that minimizes a period of an acceleration interval within a range that satisfies driving restrictions of a gimbal, based on a gimbal angle $\theta_{0i}$ of a start time and a gimbal angle $\theta_{ci}$ of a fixed interval of an attitude change. Also, the gimbal angle trajectory is calculated that minimizes a period of a deceleration interval within a range that satisfies the driving
(Continued)

restrictions of the gimbal, based on the gimbal angle $\theta_{ci}$ of the fixed interval and a gimbal angle $\theta_{fi}$ of a completion time of the attitude change. The obtained $\theta_{0i}$, $\theta_{ci}$, $\theta_{fi}$ and an attitude change period $\tau$ are transmitted to the artificial satellite as gimbal angle trajectory parameters, and the control moment gyros are controlled based on the gimbal angle trajectory parameters.

19 Claims, 13 Drawing Sheets

(51) Int. Cl.
  *B64G 1/10*  (2006.01)
  *B64G 1/36*  (2006.01)
  *B64G 3/00*  (2006.01)
  *B64G 1/24*  (2006.01)

(52) U.S. Cl.
  CPC ........ *G01C 19/02* (2013.01); *B64G 2001/245* (2013.01)

(56) References Cited

U.S. PATENT DOCUMENTS

| | | | | |
|---|---|---|---|---|
| 3,866,025 | A * | 2/1975 | Cavanagh | B64G 1/26 701/13 |
| 6,305,647 | B1 * | 10/2001 | Defendini | B64G 1/28 244/165 |
| 6,687,645 | B2 * | 2/2004 | Curey | G01C 19/28 248/182.1 |
| 7,464,899 | B2 * | 12/2008 | Elgersma | B64G 1/286 244/165 |
| 7,982,951 | B1 * | 7/2011 | Innes | G02B 23/16 359/430 |
| 8,880,246 | B1 * | 11/2014 | Karpenko | B64G 1/288 701/13 |
| 2002/0032525 | A1 * | 3/2002 | Yoshikawa | G01S 19/51 701/470 |
| 2002/0117585 | A1 * | 8/2002 | Yoshikawa | B64G 1/361 244/171 |
| 2003/0014211 | A1 * | 1/2003 | Curey | G01C 21/18 702/150 |
| 2004/0140401 | A1 * | 7/2004 | Yamashita | B64G 1/286 244/165 |
| 2007/0129853 | A1 * | 6/2007 | Greenfeld | G01C 11/02 701/3 |
| 2007/0221786 | A1 * | 9/2007 | Takeya | B64G 1/10 244/158.1 |
| 2008/0203230 | A1 * | 8/2008 | Ogo | B64G 1/286 244/165 |
| 2009/0039202 | A1 * | 2/2009 | Ogo | B64G 1/286 244/165 |
| 2009/0218449 | A1 * | 9/2009 | Kamiya | B64G 1/38 244/165 |
| 2010/0140413 | A1 * | 6/2010 | Bailey | B64G 1/244 244/165 |
| 2010/0168938 | A1 * | 7/2010 | Seo | B64G 1/244 701/13 |
| 2016/0043800 | A1 * | 2/2016 | Kingsbury | H04B 7/18513 398/125 |
| 2016/0214742 | A1 * | 7/2016 | Carroll | B64G 1/36 |
| 2016/0355279 | A1 * | 12/2016 | Lim | B64G 1/286 |
| 2019/0131464 | A1 * | 5/2019 | Seki | B64G 1/10 |
| 2019/0144140 | A1 * | 5/2019 | Hosoda | B64G 1/242 244/169 |
| 2019/0210744 | A1 * | 7/2019 | Kawamura | B64G 1/10 |
| 2019/0300207 | A1 * | 10/2019 | Izumisawa | B64G 1/242 |
| 2021/0047057 | A1 * | 2/2021 | Takagaki | B29C 70/34 |
| 2021/0078733 | A1 * | 3/2021 | Imamura | H04B 7/185 |

FOREIGN PATENT DOCUMENTS

| | | | | |
|---|---|---|---|---|
| EP | 2022718 | A1 * | 2/2009 | ............. B64G 1/244 |
| JP | 3623747 | B2 | 2/2005 | |
| JP | 2007302142 | A * | 11/2007 | ............... B64G 1/36 |
| JP | 2008189235 | A * | 8/2008 | ............. B64G 1/244 |
| JP | 4679439 | B2 | 4/2011 | |
| JP | 2012051387 | A * | 3/2012 | ............. B64G 1/428 |
| JP | 2016171458 | A * | 9/2016 | ............. B63H 25/04 |
| KR | 20160149307 | A * | 12/2016 | ............. G01C 19/04 |
| WO | WO-2010135421 | A2 * | 11/2010 | ............. B64G 1/428 |
| WO | WO-2014087683 | A1 * | 6/2014 | ............... B64G 3/00 |
| WO | WO-2015029438 | A1 * | 3/2015 | ............... B64G 9/00 |
| WO | WO-2016109601 | A1 * | 7/2016 | ............. B63H 25/04 |
| WO | WO-2016111317 | A1 * | 7/2016 | ............... G05D 1/08 |
| WO | WO-2016208504 | A1 * | 12/2016 | ............. G01C 19/02 |
| WO | WO-2017138165 | A1 * | 8/2017 | ............... B64G 1/28 |
| WO | WO-2018047817 | A1 * | 3/2018 | ............... B64G 1/10 |

OTHER PUBLICATIONS

Extended European Search Report dated Aug. 9, 2019, in Patent Application No. 17848757.5, citing documents AA and AO therein, 8 pages.

International Search Report dated Oct. 31, 2017 in PCT/JP2017/031955 filed on Sep. 5, 2017.

* cited by examiner

ARTIFICIAL SATELLITE, ATTITUDE CONTROL SYSTEM, AND ATTITUDE CONTROL METHOD

TECHNICAL FIELD

The present disclosure relates to an attitude control device, an attitude control system, a ground station, an artificial satellite, an attitude control method, and a program that use a control moment gyro (CMG) mounted on an artificial satellite.

BACKGROUND ART

An attitude control device is often used that has three or more control moment gyros (CMGs) for changing attitude of an artificial satellite. Conventionally, an attitude trajectory of the artificial satellite and a gimbal angle trajectory of the CMGs are planned beforehand for achieving quick attitude control, and attitude control is performed on the basis to such a plan (for example, see Patent Literature 1).

In the attitude control device described in Patent Literature 1, the gimbal angle trajectory includes an acceleration interval, a fixed interval, and a deceleration interval. A calculator with which the artificial satellite is equipped is described as performing iterative calculations based on Newton's laws to that a gimbal angle in the fixed interval satisfies designated attitude and attitude angular velocities in a designated period.

CITATION LIST

Patent Literature

Patent Literature 1: U.S. Patent Application Publication No. 2010/0140413

SUMMARY OF INVENTION

Technical Problem

The times at both ends of the fixed interval of the gimbal angle trajectory, that is, the completion time of the acceleration interval and the start time of the deceleration interval, are the same for the gimbal angle trajectories of all the CMGs of the attitude control device configured in this manner. Thus since a CMG having a small amount of change of the gimbal angle is, in the acceleration interval and the deceleration interval, to be driven in conformity with a CMG having the maximum amount of change of the gimbal angle, the acceleration interval and the deceleration interval sometimes are unnecessarily prolonged. In such a case, the period until the attitude angular velocity of the artificial satellite reaches a maximum value is prolonged, and such operation has a problem of leading to a prolonging of the attitude change period.

Further, the gimbal angles of the fixed interval are calculated by iterative calculations so as to satisfy the designated attitude and attitude angular velocities at the designated times, and the iterative calculations impose a heavy processing load. Thus when the gimbal angle trajectories are calculated using a calculator mounted on the artificial satellite, the period required for convergence of the calculation is sometimes long. Such operation of, for example, an earth observation satellite suffers from a decrease in the period applied to observations of the earth surface and a lowering in the number of observations.

In consideration of the aforementioned circumstances, an objective of the present disclosure is to provide an attitude control device that decreases the load of the calculator mounted on the artificial satellite and achieves the attitude change in a short period.

Solution to Problem

In order to attain the aforementioned objective, the attitude control device of the present disclosure is an attitude control device for performing attitude control of an artificial satellite using each of a plurality of control moment gyros. The attitude control device includes:

an attitude boundary condition setter to set boundary conditions of an attitude angle and an attitude angular velocity of a start time and a completion time of an attitude change of the artificial satellite; and a gimbal angle trajectory calculator to calculate a gimbal angle trajectory of each of the control moment gyros by using as prerequisites (i) satisfying the boundary conditions set by the attitude boundary condition setter, and (ii) setting for a gimbal of the control moment gyro:

an acceleration interval in which a driving capacity of the gimbal is used to accelerate rotation of the artificial satellite, a fixed interval in which a gimbal angle of the gimbal is fixed, and the rotation of the artificial satellite is constant, and a deceleration interval in which the driving capacity of the gimbal is used to decelerate the rotation of the artificial satellite.

Advantageous Effects of Invention

According to the present disclosure, the load of the calculator mounted on the artificial satellite can be decreased, and attitude change in a short period can be achieved.

DESCRIPTION OF EMBODIMENTS

Embodiment 1

Figure 1:
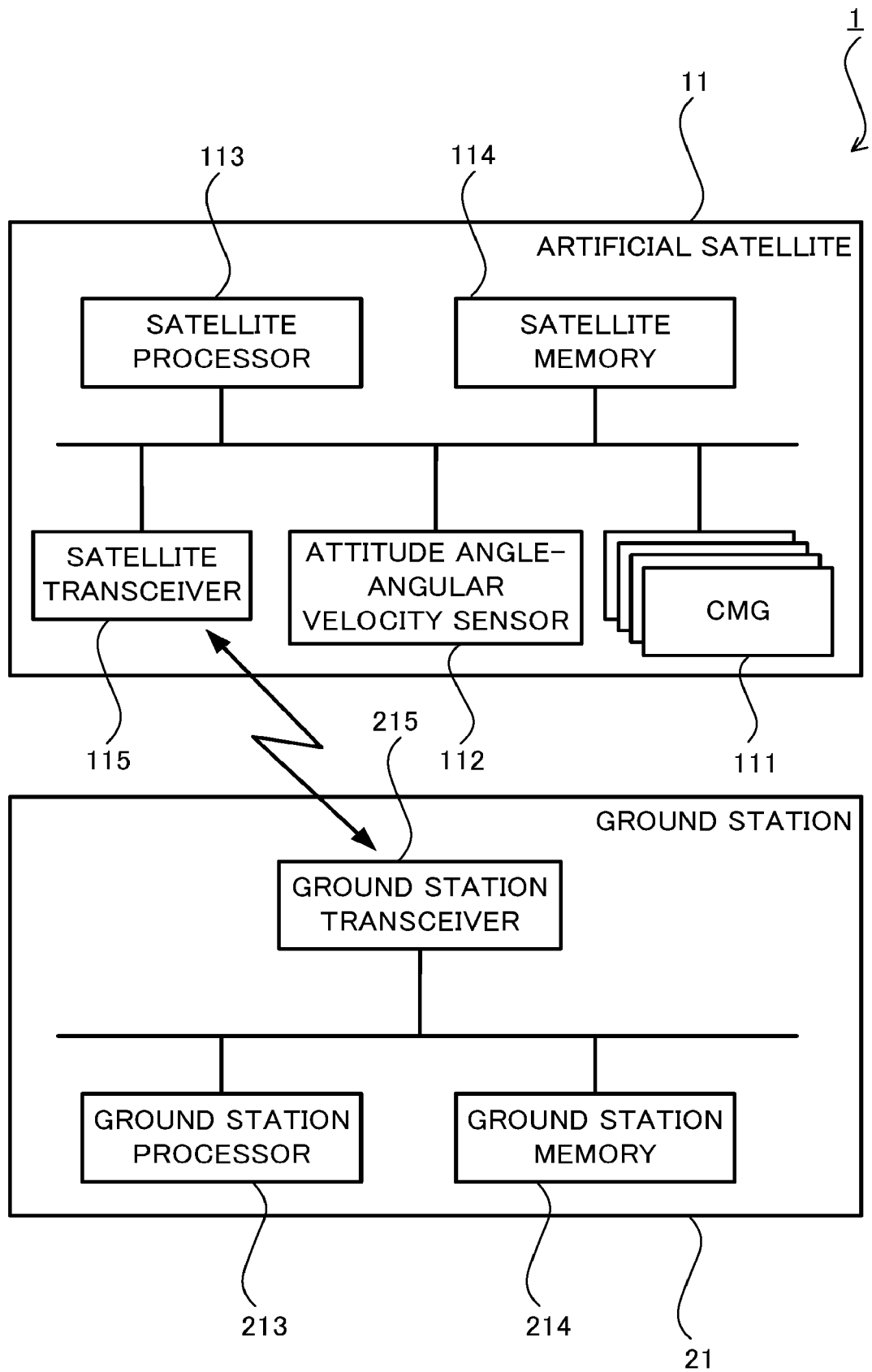
FIG. 1 is a block diagram illustrating a configuration of an attitude control system according to Embodiment 1 of the present disclosure.

A configuration of an attitude control system 1 according to Embodiment 1 of the present disclosure is illustrated in FIG. 1. As illustrated in FIG. 1, the attitude control system 1 according to the present embodiment includes an artificial satellite 11 and a ground station 21 that are in wireless communication with each other.

The artificial satellite 11 is equipped with multiple control moment gyros (CMGs) 111 that are attitude control units that control attitude of the artificial satellite, and an attitude angle-angular velocity sensor 112 that detects an attitude angle and an angular velocity of the artificial satellite 11. Further, the artificial satellite 11 is equipped with a satellite processor 113, a satellite memory 114, and a satellite transceiver 115 that performs transmission of information to, and reception of information from, the ground station 21.

The ground station 21 is equipped with a ground station processor 213, a ground station memory 214, and a ground station transceiver 215 that performs transmission of information to, and reception of information from, the artificial satellite 11.

Figure 2:
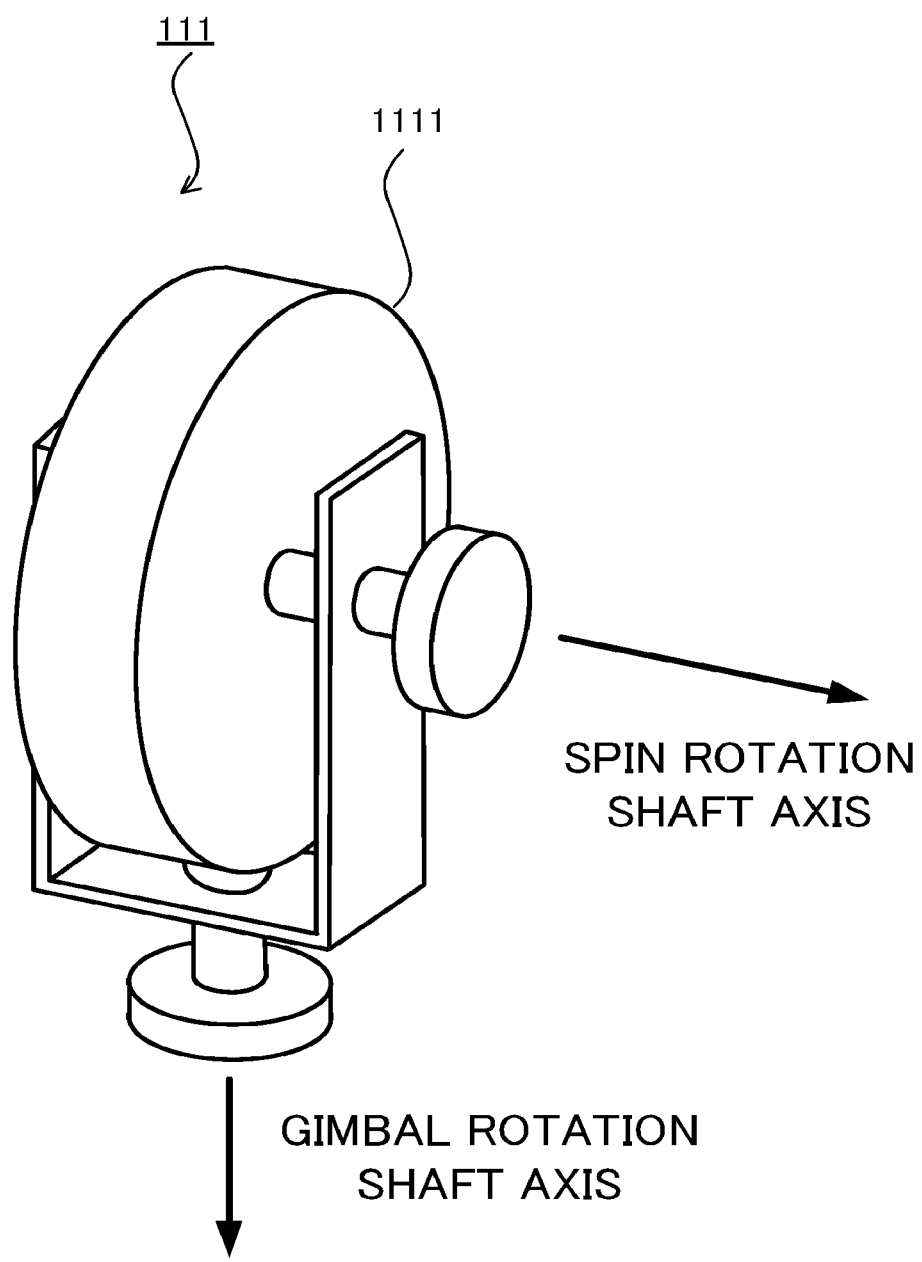
FIG. 2 is a conceptual diagram of a CMG.

FIG. 2 is a conceptual diagram of the CMG 111 that is an attitude control actuator of the artificial satellite 11 and is equipped with a single gimbal rotation shaft. The CMG 111 has a spin rotation shaft that is a rotation shaft of a wheel 1111 that rotates at high speed and the gimbal rotation shaft for causing rotation of the axis of the rotation shaft of the wheel 1111. Due to high speed rotation, the wheel 1111 has fixed angular momentum around the axis of the spin rotation shaft. By causing the direction of the angular momentum of this wheel 1111 to rotate around the axis of the gimbal rotation shaft, a large reaction torque acts upon the body of the satellite, and this torque is used to perform attitude control.

Figure 3:
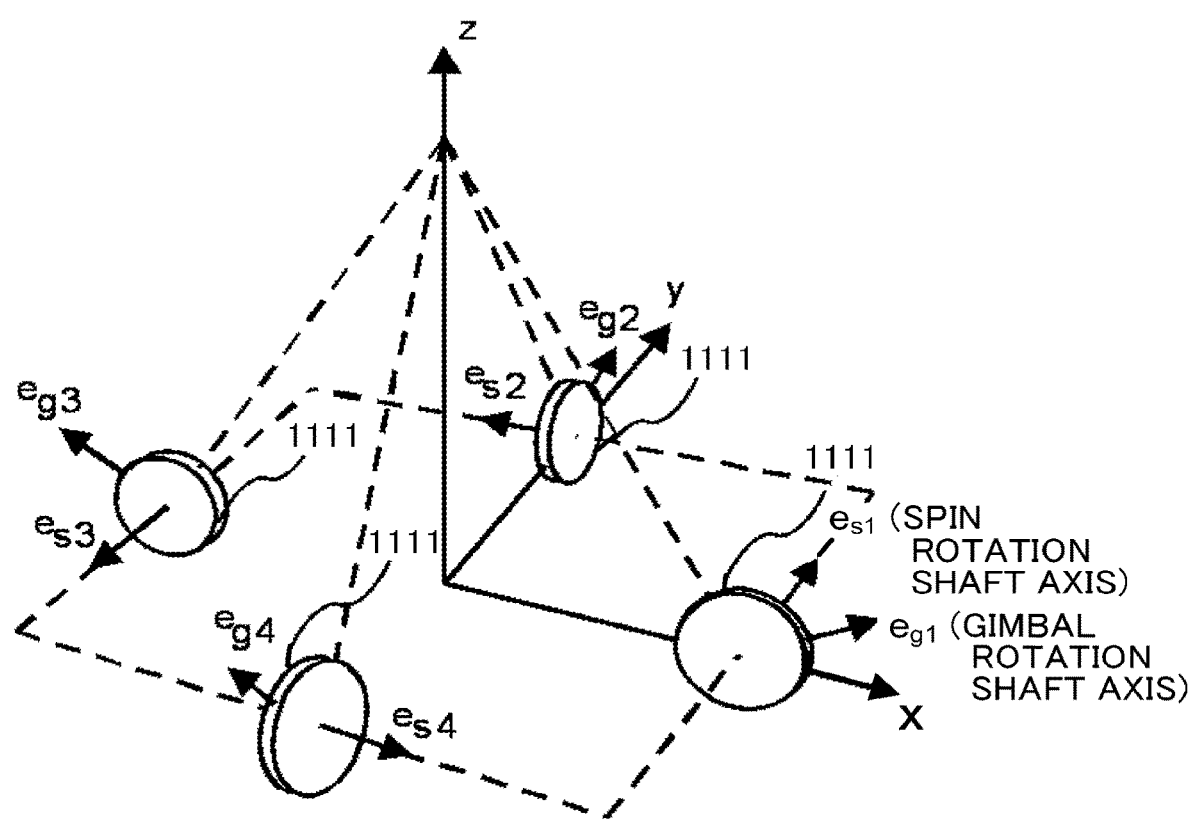
FIG. 3 is an example configuration of an arrangement of multiple CMGs in an artificial satellite.

FIG. 3 illustrates an example configuration in which multiple CMGs 111 are arranged in the artificial satellite 11. As illustrated in FIG. 3, normally, four or more CMGs 111 are arranged in the artificial satellite 11. Attitude control of the artificial satellite 11 is achieved by cooperative operation of these CMGs 111. The arrangement illustrated in FIG. 3 is termed a "pyramid arrangement" due to arrangement of the CMGs 111 at the base of a quadrangular pyramid, and this is one typical example of arrangement of the CMGs 111.

Often the number of provided CMGs is at least three. However, the number of CMGs is not limited to at least three, and the number of CMGs can be reduced, for example, by use in combination with other attitude control units. If control of rotation around one axis is unnecessary, a configuration of two CMGs may be used.

The present disclosure can be used with advantage also for configurations that in this manner have a small number of CMGs.

The attitude angle-angular velocity sensor 112 is a sensor that detects the attitude angle and angular velocity of the artificial satellite 11 and includes any conventional type of such sensor.

The satellite processor 113 includes a central processing unit (CPU) or any other freely-selected calculation-processing device. By reading a program stored in the satellite memory 114 and then executing the read program, the satellite processor 113 functions as functional units that are a gimbal angle trajectory re-calculator 1131, an attitude trajectory calculator 1132, an attitude controller 1133, a steering unit 1134, and a gimbal controller 1135.

The satellite memory 114 includes: volatile or non-volatile semiconductor memory such as flash memory, EPROM, or EEPROM; and/or a freely-selected storage device such as a magnetic disc, a flexible disc, an optical disc, a compact disc, a mini-disc, or DVD.

The satellite memory 114 stores various types of data calculated and determined by the functional units of the satellite processor 113. Specifically, the target values of gimbal angle and angular velocity calculated and determined by the gimbal angle trajectory re-calculator 1131 and the target values of the satellite attitude angle and angular velocity set by the attitude trajectory calculator 1132 are stored. Further, a feedback attitude control torque determined by the attitude controller 1133, a feedback gimbal angle and angular velocity of each CMG 111 calculated by the steering unit 1134 and a gimbal control torque calculated by the gimbal controller 1135 are stored.

Further, the satellite memory 114 stores gimbal angle trajectory parameters received by the satellite transceiver 115. The satellite memory 114 also stores a program executed by the satellite processor 113 for attitude control by the CMGs 111.

The satellite transceiver 115 transmits to the ground station 21 the attitude angle and angular velocity measured by the attitude angle-angular velocity sensor 112, and the satellite position and velocity acquired by other sensors of the artificial satellite 11; and the satellite transceiver 115 receives from the ground station 21 control data including the gimbal angle trajectory parameters.

The ground station processor 213 includes a central processing unit (CPU) or any other freely-selected calculation-processing device. By reading a program stored in the ground station memory 214 and then executing the read program, the ground station processor 213 functions as functional units that are an attitude boundary condition setter 2131 and a gimbal angle trajectory calculator 2132.

The ground station memory 214 includes: volatile or non-volatile semiconductor memory such as flash memory, EPROM, or EEPROM; and/or a freely-selected storage device such as a magnetic disc, a flexible disc, an optical disc, a compact disc, a mini-disc, or DVD.

The ground station memory 214 stores: attitude boundary conditions determined by the attitude boundary condition setter 2131 of the ground station processor 213, and the gimbal angle trajectory parameters calculated by the gimbal angle trajectory calculator 2132. Further, the ground station memory 214 stores programs executed by the ground station processor 213 to calculate the attitude boundary conditions and the gimbal angle trajectory.

The ground station transceiver 215 receives various types of data transmitted by the artificial satellite 11, including the satellite position, velocity, attitude angle, and angular velocity acquired by the artificial satellite 11; and the ground station transceiver 215 transmits control data including the gimbal angle trajectory parameters calculated by the gimbal angle trajectory calculator 2132.

Figure 4:
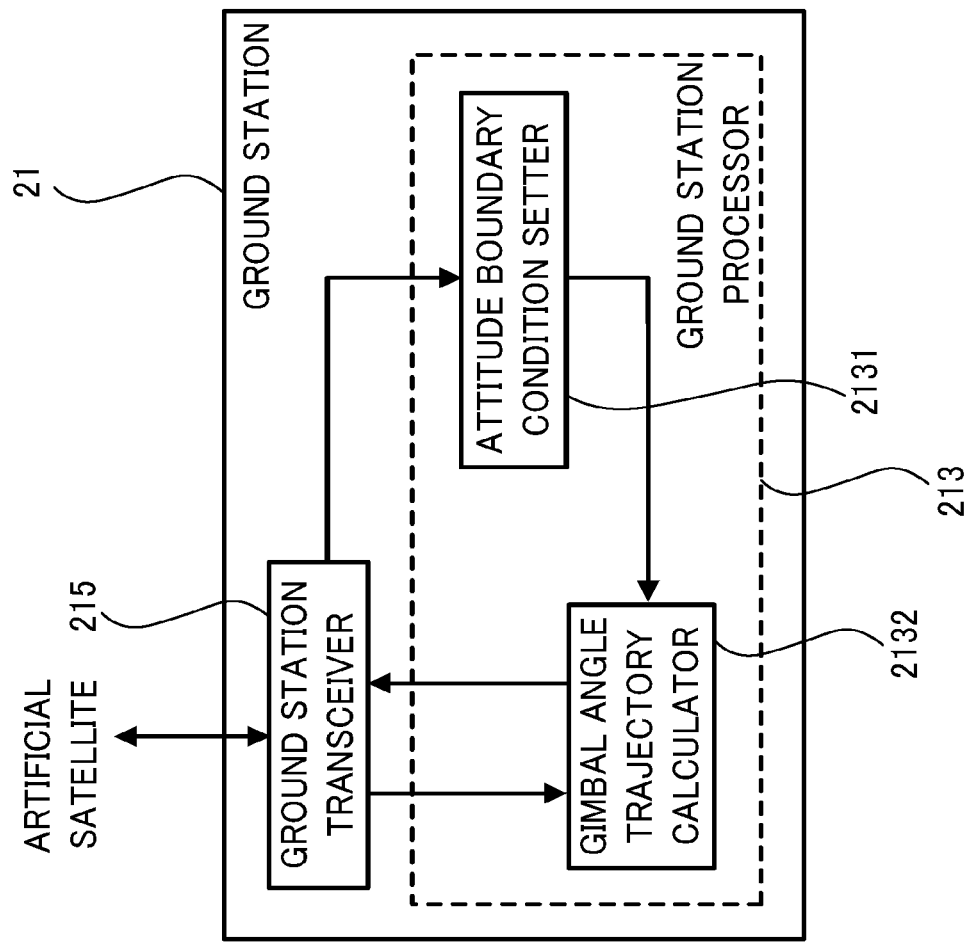
FIG. 4 is a functional block diagram illustrating parts of a ground station that relate to attitude control.
Figure 5:
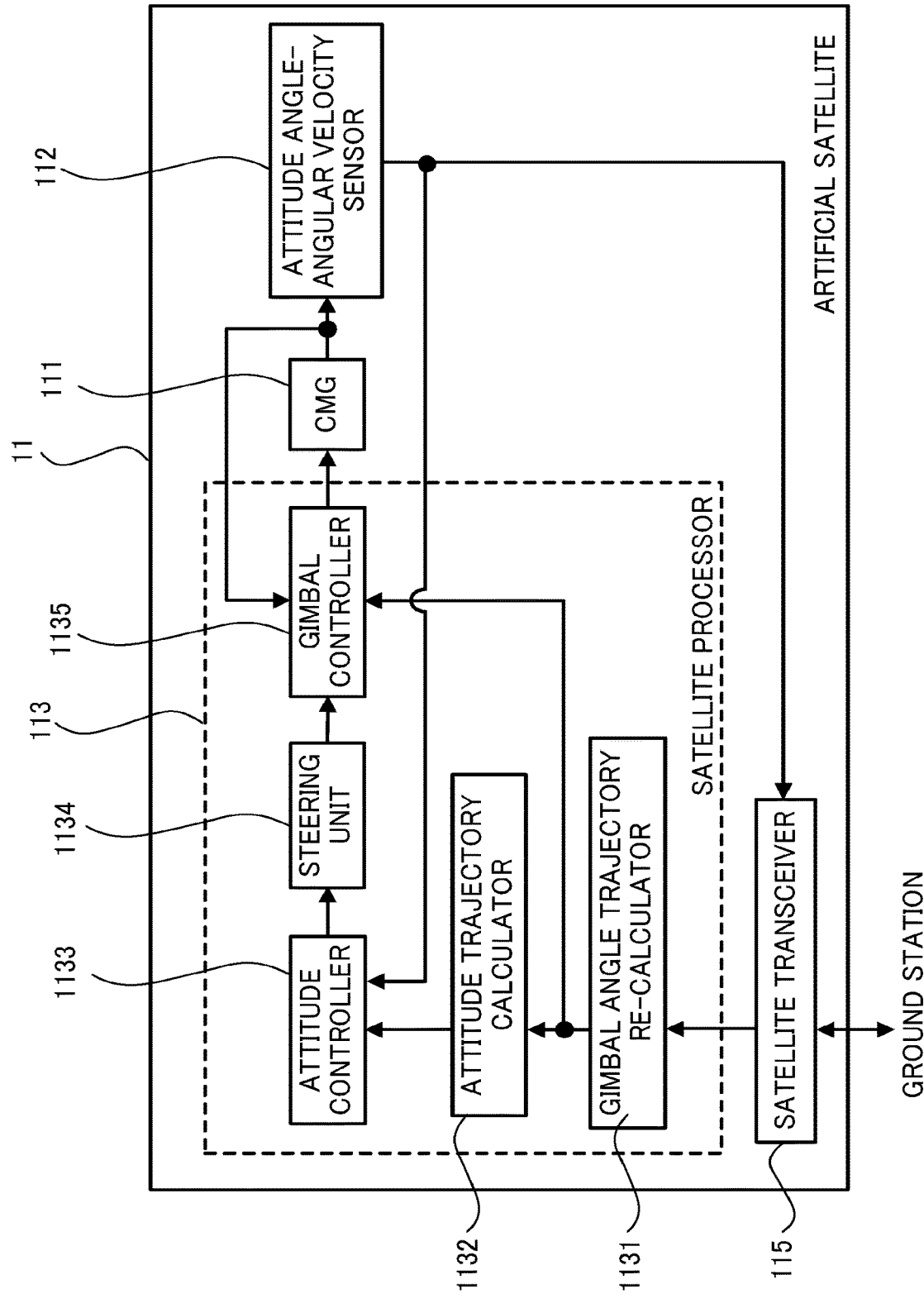
FIG. 5 is a functional block diagram illustrating parts of the artificial satellite that relate to attitude control.

Operation of the attitude control system 1 configured in the above-describe manner is described with reference to FIGS. 4 and 5. FIG. 4 is a functional block diagram illustrating parts of the ground station 21 that relate to attitude control, and FIG. 5 is a functional block diagram illustrating parts of the artificial satellite 11 that relate to attitude control.

Firstly, at the ground station 21 illustrated in FIG. 4, the ground station transceiver 215 receives from the artificial satellite 11 the position, velocity, attitude angle, and attitude angular velocity of the artificial satellite 11. On the basis of the information of position, velocity, attitude angle, and attitude angular velocity received by the ground station transceiver 215, the attitude boundary condition setter 2131 of the ground station processor 213 sets boundary conditions concerning the attitude angle and angular velocity of the artificial satellite 11 at the start time when the attitude change begins and the completion time when the attitude change ends.

The gimbal angle trajectory calculator 2132 of the ground station 21 calculates a gimbal angle trajectory that satisfies the boundary conditions calculated by the attitude boundary condition setter 2131 and that is also for changing the attitude in a short period; and the gimbal angle trajectory calculator 2132 calculates the gimbal angle trajectory parameters that express this gimbal angle trajectory.

In the calculation of the gimbal angle trajectory for changing the attitude, the gimbal angle trajectory is calculated using a prerequisite that rotation of the artificial satellite 11 is accelerated and decelerated by using the driving capacity of the gimbal of the CMG 111. Specifically, the prerequisite is that the following are set for each gimbal: the acceleration interval in which the rotation of the artificial satellite 11 accelerates by using the driving capacity of the gimbal of each CMG 111, the fixed interval in which the gimbal angle is fixed and the rotation of the artificial satellite 11 is fixed, and the deceleration interval in which the rotation of the artificial satellite 11 decelerates by using the driving capacity of the gimbal of each CMG 111.

Then the gimbal angle trajectory calculator 2132 outputs the obtained gimbal angle trajectory parameters to the ground station transceiver 215. The ground station transceiver 215 transmits the gimbal angle trajectory parameters to the artificial satellite 11. The driving capacity of the gimbal is an upper limit of at least one of gimbal angular velocity, gimbal angular acceleration, or gimbal angular jerk (change of angular acceleration per unit time) during changing of the gimbal angles. The driving capacity may be a rated capacity stipulated for each gimbal. Alternatively, the driving capacity of the gimbal may be a value obtained by multiplication of a rated capacity of each gimbal by a predetermined proportion.

In the artificial satellite 11 illustrated in FIG. 5, the satellite transceiver 115 receives the gimbal angle trajectory parameters and outputs the received gimbal angle trajectory parameters to the gimbal angle trajectory re-calculator 1131. On the basis of the inputted gimbal angle trajectory parameters, the gimbal angle trajectory re-calculator 1131 reproduces the gimbal angle trajectory from the prerequisites set by the gimbal angle trajectory calculator 2132, and calculates the target values of the gimbal angle and angular velocity.

The attitude trajectory calculator 1132 calculates the target values of the satellite attitude angle and angular velocity from the target values of the gimbal angle and angular velocity calculated by the gimbal angle trajectory re-calculator 1131. The attitude controller 1133 calculates the feedback attitude control torque based on the deviation of the actual measured values of the satellite attitude angle and angular velocity obtained from the attitude angle-angular velocity sensor 112 from the target values of the satellite attitude angle and angular velocity.

The steering unit 1134 calculates the feedback gimbal angle and angular velocity of each of the CMGs 111 from the feedback attitude control torque calculated by the attitude controller 1133.

The gimbal controller 1135 calculates, as gimbal angle and angular velocity command values, sums obtained by adding together the feedback gimbal angle and angular velocity calculated by the steering unit 1134 and the gimbal angle and angular velocity calculated by the gimbal angle trajectory re-calculator 1131. The gimbal controller 1135 causes each of the CMGs 111 to be driven at the obtained gimbal angle and angular velocity command values. Specifically, the gimbal controller 1135 feeds back the present gimbal angle and angular velocity obtained from each of the CMGs 111 to the gimbal angle and angular velocity command values, calculates the gimbal control torque, and outputs the calculated gimbal control torque to the respective CMGs 111.

Each CMG 111 is driven at the gimbal control torque calculated by the gimbal controller 1135, and the resultant reaction torque contributes to the attitude of the artificial satellite 11. Thus the attitude of the artificial satellite 11 is controlled such that the satellite attitude angle and angular velocity become the target values. Then the attitude angle and angular velocity detected by the attitude angle-angular velocity sensor 112, and the satellite position and velocity acquired by other sensors of the artificial satellite 11, are transmitted from the satellite transceiver 115 to the ground station 21.

Figure 6:
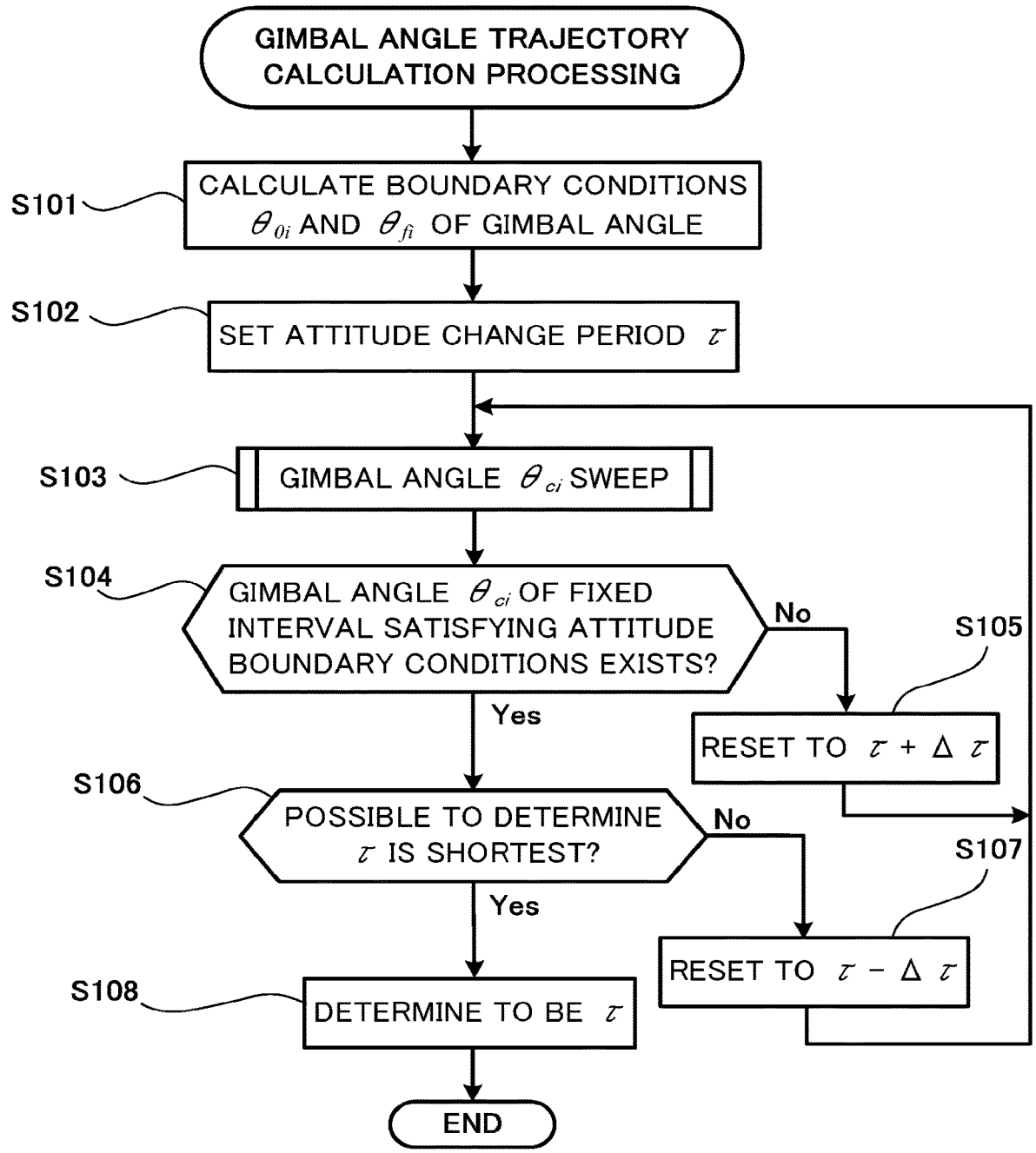
FIG. 6 is a flowchart illustrating gimbal angle trajectory calculation processing.
Figure 7:
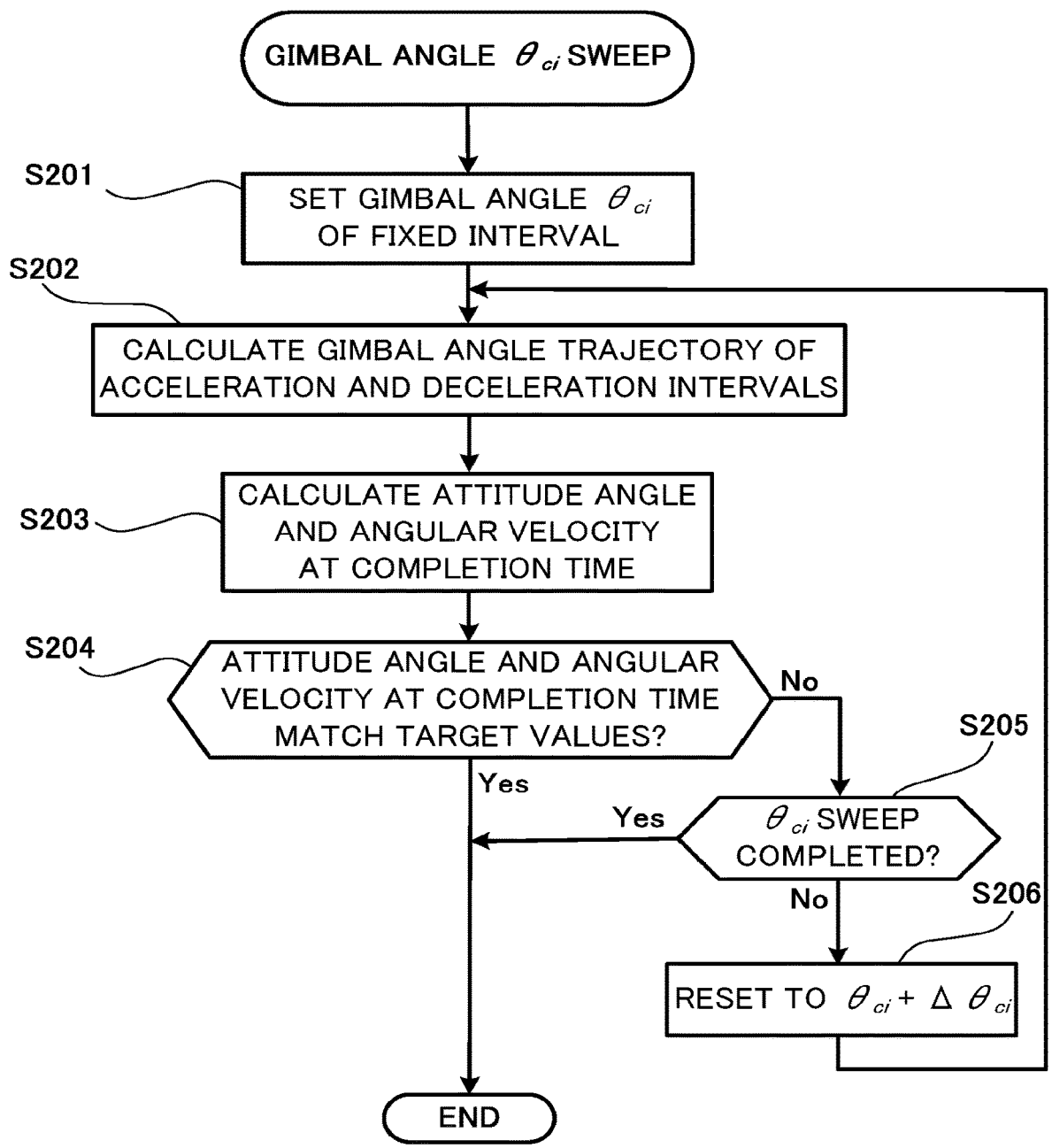
FIG. 7 is a flowchart illustrating a part of the gimbal angle trajectory calculation processing.

The gimbal angle trajectory calculator 2132 of the ground station 21 during the aforementioned operation of the attitude control system 1 is described below in detail with reference to FIGS. 6 and 7. FIG. 6 is a flowchart illustrating the gimbal angle trajectory calculation processing, and FIG. 7 is a flowchart illustrating in detail a part of the processing of FIG. 6.

The gimbal angle trajectory calculated by the gimbal angle trajectory calculator 2132 includes the acceleration interval, the fixed interval, and the deceleration interval. The acceleration interval is the period in which the gimbal angle is increased from the starting end value to the fixed value, the fixed interval is the period in which the gimbal angle is maintained at a fixed value, and the deceleration interval is the period in which the gimbal angle is decreased from the fixed value to the completion end value.

The gimbal angle trajectory calculator 2132, for each gimbal, calculates the acceleration interval, the fixed interval, and the deceleration interval. The gimbal angle trajectory calculator 2132 during this operation calculates the gimbal trajectory by setting conditions such that: during the acceleration interval, rotation of the artificial satellite 11 is accelerated by using the driving capacity of the gimbal of each CMG 111; during the fixed interval, the gimbal angle is fixed to allow the artificial satellite 11 to rotate at constant angular velocity; and during the deceleration interval, rotation of the artificial satellite 11 is decelerated by using the driving capacity of the gimbal of each CMG 111. Thus the acceleration interval, the fixed interval and the deceleration interval calculated by the gimbal angle trajectory calculator 2132 are calculated for each gimbal, and the fixed gimbal angle for the fixed interval is also calculated for each gimbal.

Further, the driving capacity of the gimbal of each of the CMGs 111 may be the rated capacity of the CMG 111, or the driving capacity of the gimbal may be a value obtained by multiplication of the rated capacity of the CMG 111 by a predetermined proportion. The period of the attitude change is minimized by using the rated capacity as the driving capacity. When the value obtained by multiplication of the rated capacity by the predetermined proportion is used as the driving capacity, the period of the attitude change can be reduced while reducing energy consumption.

The gimbal angle trajectory calculator 2132 acquires the boundary conditions concerning the attitude angle and the attitude angular velocity of the artificial satellite 11 at the attitude change start time and the attitude change completion time from the attitude boundary condition setter 2131, and on the basis of the acquired boundary conditions, determines a gimbal angle $\theta_{0i}$ of the attitude change start time and a gimbal angle $\theta_{fi}$ of the attitude change completion time, where the symbol "i" indicates the i-th CMG (step S101).

The gimbal angle trajectory calculator 2132 next sets an attitude change period τ (step S102). Here, the attitude change period τ is a period required for the change of the attitude in order to, when the attitude boundary conditions for the start time and the completion time are provided, satisfy such boundary conditions. The attitude change period τ can be estimated from magnitudes of the angular momentum envelope surface of the CMG 111 and the inertial moment of the artificial satellite 11. Specifically, when the attitude at the completion time relative to the attitude at the start time is expressed by a rotation of the angle φ around the Euler axis, the attitude change period τ can be estimated by the below Formula (1).

Formula (1)

$$\tau = \frac{|I\hat{a}|\varphi}{h_{env}} \quad (1)$$

â: Euler axis
I: inertial matrix of the satellite
$h_{env}$: magnitude of the angular momentum envelope in the Id direction The gimbal angle trajectory calculator 2132 next sweeps the gimbal angle $\theta_{ci}$ of the fixed interval (step S103) and determines whether a gimbal angle $\theta_{ci}$ exists that satisfies the attitude boundary conditions for the attitude change period τ set in step S102 (step S104). Details of the processing of step S103 are described below.

If the determination in step S104 is that no gimbal angle exists that satisfies the attitude boundary conditions (NO in step S104), the attitude change in the period τ is impossible, and thus the attitude change period z is reset to a value of τ+Δτ that is larger than τ (step S105), and processing returns to step S103.

However, if in step S104 a gimbal angle $\theta_{ci}$ exists that satisfies the attitude boundary conditions (YES in step S104), processing proceeds to step S106. In the case in which the gimbal angle is swept for the first time and no determination can be made that τ is shortest (NO in step S106), a possibility exists that the attitude change period can be further shortened, and thus the attitude change period τ is reset to a value of τ−Δτ that is smaller than rat the present point in time (step S107), and processing returns to step S103.

In the case in which, by repeating of the steps S103 to S107, determination is possible that τ is shortest (YES in step S106), the value of τ at that time is determined to be the shortest attitude change period (step S108).

Specific operations occurring during step S103 of FIG. 6 are described below.

In step S201, the gimbal angle trajectory calculator 2132 firstly sets the gimbal angle $\theta_{ci}$ of the fixed interval of the gimbal angle trajectory, where the symbol "i" indicates a value for the i-th CMG 111. Then in step S202, for each of the CMGs 111, as a condition for using the driving capacity of the gimbal, a time change of the gimbal angle trajectory for driving from the a gimbal angle $\theta_{0i}$ of the attitude change start time to the gimbal angle $\theta_{ci}$ of the fixed interval is calculated. The gimbal angle trajectory of the acceleration interval is obtained by this calculation (step S202). Here, the driving capacity of the gimbal may be the rated capacity of each gimbal, or may be a capacity determined by multiplying the rated capacity of each gimbal by a predetermined proportion.

Further, the gimbal angle trajectory of the deceleration interval from the gimbal angle $\theta_{ci}$ of the fixed interval to the gimbal angle $\theta_{fi}$ of the completion time is similarly calculated on the condition that the driving capacity of the gimbal is used up to the upper limit (step S202). Further, the gimbal angle of the attitude change start time and the gimbal angle of the completion time are calculated from the boundary conditions of the attitude angle and the attitude angular velocity in step S101.

The gimbal angle trajectory calculator 2132 next integrates the attitude angular velocity of the artificial satellite 11 along the gimbal angle trajectory determined in step S202 from the attitude change start time to the completion time, and calculates the attitude angle at the completion time (step S203). Then determination is made as to whether the attitude angle and the angular velocity at the completion time calculated in step S203 match target values (step S204). In the case in which this attitude angle and the angular velocity do not match the target values (NO in step S204), determination is made as to whether the sweep of the gimbal angle $\theta_{ci}$ is completed (step S205). If sweep is not completed (NO in step S205), the gimbal angle $\theta_{ci}$ of the fixed interval is reset to a value $\theta_{ci}+\Delta\theta_{ci}$ (step S206), and processing returns to step S202.

However, in the case in which the attitude angle and the angular velocity at the completion time match the target values (YES in step S204), the value of the gimbal angle $\theta_{ci}$ at this time is output, a determination is made that the gimbal angle $\theta_{ci}$ of the fixed interval exists that satisfies the attitude boundary conditions in step S104 of FIG. 6 (YES in step S104), and processing proceeds to step S106. In the case in which the determination in step S205 is made that the sweep is completed (YES in step S205), a determination is made that no gimbal angle $\theta_{ci}$ of the fixed interval exists that satisfies the attitude boundary conditions in step S104 of FIG. 6 (NO in step S104), and processing proceeds to step S105.

The change amount $\Delta\theta_{ci}$ of the gimbal angle $\theta_{ci}$ can be determined by using Newton's laws.

The method of calculation of the gimbal angle trajectory in the acceleration-deceleration intervals in step S202 is described below. For each of the CMGs 111, the gimbal is driven under conditions, in the acceleration interval and the deceleration interval, that allow use of the driving capacity of the CMG 111 within a range that does not deviate from driving restrictions of the gimbal. Thus the periods of the acceleration and deceleration can be minimized for each of the CMGs 111.

Examples that can be cited of the driving restrictions of the gimbal include an angular velocity restriction, an angular acceleration restriction, and an angular jerk (change of angular acceleration per unit time) restriction of the gimbal. Thus for each of the CMGs 111 the gimbal is driven under conditions that, within a range that does not deviate from these driving restrictions, use up to the upper limit the driving capacity contributing to at least one of the angular velocity, the angular acceleration, and the angular jerk.

Here, the gimbal angle at the start time of the attitude change is indicated by $\theta_{0i}$, the gimbal angle at the fixed interval is indicated by $\theta_{ci}$, and the difference between $\theta_{0i}$ and $\theta_{ci}$ is given by the formula $\Delta\theta_i = \theta_{ci} - \theta_{0i}$.

In the case in which the three restrictions of the angular velocity restriction, the angular acceleration restriction, and the angular jerk restriction are considered, a period $\tau_{ai}$ of driving of the gimbal from the gimbal angle $\theta_{0i}$ to $\theta_{ci}$ is calculated as per one of the following three cases of case 1 to 3 in accordance with the magnitude of $\Delta\theta_i$. In this calculation, the upper limit values of the angular velocity, the angular acceleration, and the angular jerk during driving of the gimbal are expressed as indicated in Formula (2).

Formula (2)

$\dot{\theta}_{max}$:upper limit of angular velocity $\ddot{\theta}_{max}$:upper limit of angular acceleration $\dddot{\theta}_{max}$:upper limit of angular jerk  (2)

Driving of the gimbal is required to be restricted in a manner such that the absolute values of the angular velocity, the angular acceleration, and the angular jerk during driving of the gimbal are below the respective upper limit values expressed in the Formula (2).

Case 1
In this case, the Formula (3) applies.

Formula (3)

$$\Delta\theta_i \geq \left(\frac{\ddot{\theta}_{max}^2}{\dddot{\theta}_{max}} + \frac{\dot{\theta}_{max}^2}{\ddot{\theta}_{max}}\right)\dot{\theta}_{max} \quad (3)$$

In this Case 1, in order to cause driving of the gimbal from the gimbal angle $\theta_{0i}$ to $\theta_{ci}$ in the shortest period, driving is performed so as to reach the upper limit for each of the angular velocity, the angular acceleration, and the angular jerk during driving of the gimbal. That is to say, the gimbal is driven in a driving pattern that uses to the upper limits the driving capacity contributing to each of the angular velocity, the angular acceleration, and the angular jerk of the gimbal. At this time, the time history of the gimbal angular velocity during the acceleration interval is a trapezoidal history, and the angular velocity at the top side of the trapezoid has a value expressed in Formula (4).

Formula (4)

$\dot{\theta}_{max}$  (4)

Further, the time history of the gimbal angular acceleration assumes a combination of two trapezoidal patterns, and the gimbal angular acceleration that is the top side of the trapezoid assumes either of two values expressed in Formula (5).

Formula (5)

$+\ddot{\theta}_{max}, -\ddot{\theta}_{max}$  (5)

The time history of the gimbal angular jerk assumes one of three values expressed in Formula (6).

Formula (6)

$+\dddot{\theta}_{max}, -\dddot{\theta}_{max}, 0$  (6)

In Case 1, due to driving of the gimbal in the aforementioned manner, the period $\tau_{ai}$ of the acceleration interval of the i-th CMG 111 is obtained by the following Formula (7).

Formula (7)

$$\tau_{ai} = \frac{\Delta\theta_i}{\dot{\theta}_{max}} + \frac{\dot{\theta}_{max}}{\ddot{\theta}_{max}} + \frac{\ddot{\theta}_{max}}{\dddot{\theta}_{max}} \quad (7)$$

Case 2
In this case, Formula (8) applies.

Formula (8)

$$\frac{2\ddot{\theta}_{max}^3}{\dddot{\theta}_{max}^2} \leq \Delta\theta_i < \left(\frac{\ddot{\theta}_{max}^2}{\dddot{\theta}_{max}} + \frac{\dot{\theta}_{max}^2}{\ddot{\theta}_{max}}\right)\dot{\theta}_{max} \quad (8)$$

In this case, in order to cause driving of the gimbal from the gimbal angle $\theta_0$, to $\theta_{ci}$ in the shortest period, driving is performed so as to reach the upper limits during driving of the gimbal for the angular acceleration and the angular jerk of the gimbal. That is to say, the gimbal is driven in a driving pattern that uses to the upper limits the driving capacity contributing to each of the angular acceleration and the angular jerk of the gimbal. At this time, the time history of the gimbal angular velocity during the acceleration interval is a triangular history, and the maximum value of the gimbal angular velocity does not reach the value expressed in Formula (4).

Further, the time history of the gimbal angular acceleration assumes a combination of two trapezoidal patterns, and the gimbal angular acceleration that is the top side of the trapezoid assumes either of two values expressed in Formula (5). The time history of the gimbal angular jerk assumes one of the three values expressed in Formula (6). In Case 2, due to driving of the gimbal in the aforementioned manner, the period $\tau_{ai}$ of the acceleration interval of the i-th CMG 111 is obtained by the following Formula (9).

Formula (9)

$$\tau_{ai} = \frac{4\Delta\theta_i}{-T_j\ddot{\theta}_{max} + \sqrt{T_j^2\ddot{\theta}_{max}^2 + 4\ddot{\theta}_{max}\Delta\theta_i}} \quad (9)$$

where $T_j = \ddot{\theta}_{max}/\dddot{\theta}_{max}$

Case 3
In this case, Formula (10) applies.

Formula (10)

$$0 \leq \Delta\theta_i < \frac{2\ddot{\theta}_{max}^3}{\dddot{\theta}_{max}^2} \quad (10)$$

In this case, in order to cause driving of the gimbal from the gimbal angle $\theta_{0i}$ to $\theta_{ci}$ in the shortest period, driving is performed so as to reach the upper limit during driving of the gimbal for the angular jerk of the gimbal. That is to say, the gimbal is driven in a driving pattern that uses to the upper limit the driving capacity contributing to the angular jerk of the gimbal. At this time, the time history of the gimbal angular velocity during the acceleration interval is a triangular history, and the maximum value of the gimbal angular velocity does not reach the value expressed in Formula (4).

Further, the time history of the gimbal angular acceleration assumes a combination of two triangular patterns, and among the two values expressed in Formula (5), neither the maximum value nor the minimum value of the angular acceleration are reached. The time history of the gimbal angular jerk assumes either of two values expressed in Formulae (11).

Formula (11)

$$+\dddot{\theta}_{max}, -\dddot{\theta}_{max} \quad (11)$$

In Case 3, due to driving of the gimbal in the aforementioned manner, the period $\tau_{ai}$ of the acceleration interval of the i-th CMG 111 is obtained by the following Formula (12).

Formula (12)

$$\tau_{ai} = 4\ddot{\theta}_{max}/\dddot{\theta}_{max} \quad (12)$$

When the gimbal angle $\theta_{0i}$ at the start time of the attitude change and the gimbal angle $\theta_{ci}$ at the fixed interval are given by the method of one of the above-mentioned Case 1 to Case 3, the gimbal angle trajectory can be obtained that has a minimized period of the acceleration interval while satisfying the driving restrictions of the gimbal.

Further, in the same manner, when the gimbal angle $\theta_{ci}$ of the fixed interval and the gimbal angle $\theta_{fi}$ at the completion time of the attitude change are obtained, the gimbal angle trajectory can be obtained that has a minimized period of the deceleration interval while satisfying the driving restrictions of the gimbal. The period of the deceleration interval of the i-th CMG 111 is taken to be $\tau_{di}$. Generally $\theta_{0i}$, $\theta_{ci}$, and $\theta_{fi}$ are different for each CMG 111, and thus $\tau_{ai}$ and $\tau_{di}$ also may have values that differ for each CMG 111.

Due to the gimbal angle trajectory calculator 2132 performing calculations by the aforementioned method, the gimbal angle trajectory can be obtained that enables the attitude change in a short period while satisfying the attitude boundary conditions. Here, the amounts required for describing the gimbal angle trajectory are $\theta_{0i}$, $\theta_{ci}$, $\theta_{fi}$, and $\tau$. Thus the ground station 21 transmits to the artificial satellite 11 $\theta_{0i}$, $\theta_{ci}$, $\theta_{fi}$, and $\tau$, as the gimbal angle trajectory parameters, via the ground station transceiver 215.

The artificial satellite 11 receives the gimbal angle trajectory parameters via the satellite transceiver 115, and the gimbal angle trajectory re-calculator 1131 uses these parameters to recalculate the gimbal angle trajectory. Thus the gimbal angle trajectory can be obtained that satisfies the attitude boundary conditions without the performance of iterative calculations at the artificial satellite 11.

The gimbal angle trajectory obtained in such a manner is characterized in that, for all of the CMGs 111, the driving capacity particular to the gimbal is used up to the upper limit of the driving capacity. Thus the period until the attitude angular velocity of the satellite reaches the maximum value can be shortened in comparison to calculation as in the conventional trajectory calculation method for which the fixed interval of the gimbal angle trajectory is the same for all the CMGs 111. That is, the attitude change period can be shortened.

Further, in the case in which the count of mounted CMGs 111 is four, a specific example of a data string transmitted from the ground station transceiver 215 to the satellite transceiver 115 is formed from the line of 13 variables $\theta_{01}$, $\theta_{c1}$, $\theta_{f1}$, $\theta_{02}$, $\theta_{c2}$, $\theta_{f2}$, $\theta_{03}$, $\theta_{c3}$, $\theta_{f3}$, $\theta_{04}$, $\theta_{c4}$, and $\theta_{f4}$ as the gimbal angle trajectory parameters.

Further, the artificial satellite 11 and the ground station 21 are required to jointly possess the values of the driving capacities particular to of the gimbals, and thus the data string transmitted from the ground station transceiver 215 to the satellite transceiver 115, in addition to the aforementioned 13 variables, includes upper limits of three variables that are the angular velocity, angular acceleration, and angular jerk indicated in Formula (2).

Next, a specific example of the data string transmitted from the satellite transceiver 115 to the ground station transceiver 215 is the x component, y component, and z component of the position of the satellite, and the x component, y component, and z component of velocity of the satellite in a standard coordinate system; and the roll angle, pitch angle, yaw angle, roll angular velocity, pitch angular velocity, yaw angular velocity, roll angular acceleration, pitch angular acceleration, and yaw angular acceleration of a satellite-fixed coordinate system relative to the standard coordinate system. An earth-centered inertial coordinate system is cited as an example of the standard coordinate system for describing position and velocity, and a fixed-orbit coordinate system is cited as an example of the standard coordinate system for describing the attitude angle and attitude angular velocity, although naturally a coordinate system other than these coordinate systems may be used as the standard coordinate system.

Figure 8:
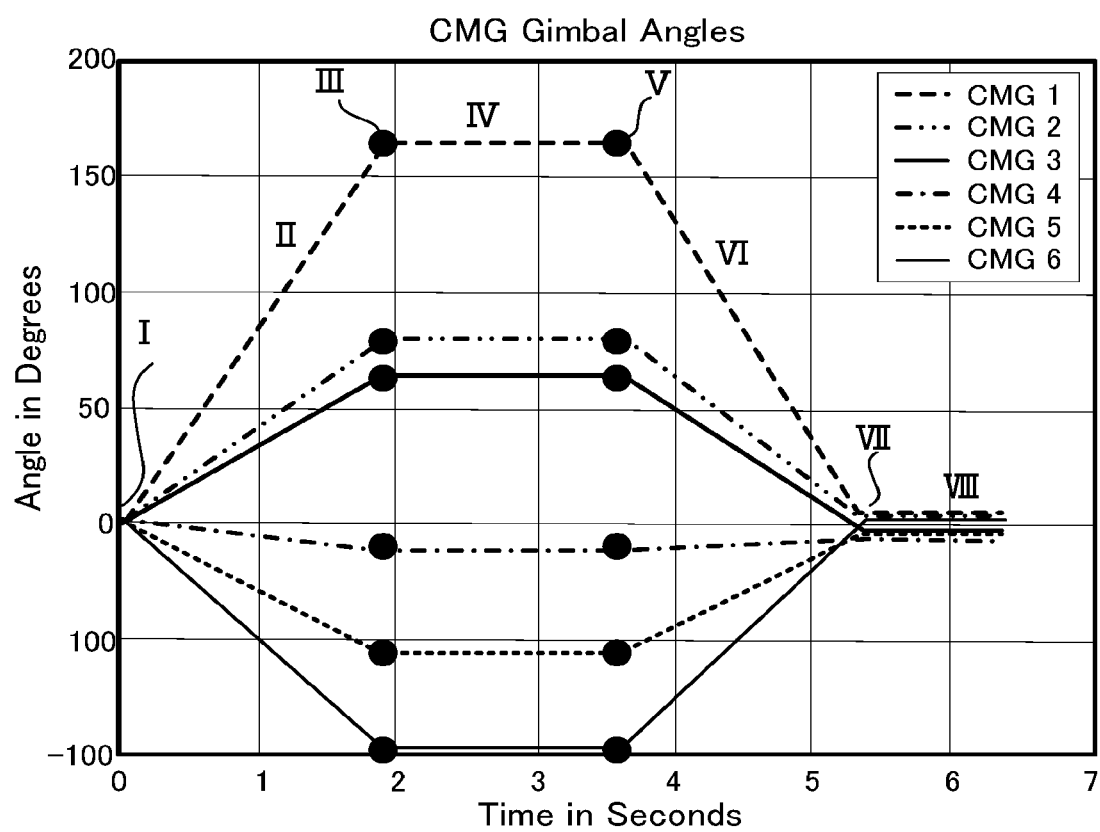
FIG. 8 is a drawing illustrating gimbal angle trajectories calculated by a conventional trajectory calculation method.
Figure 9:
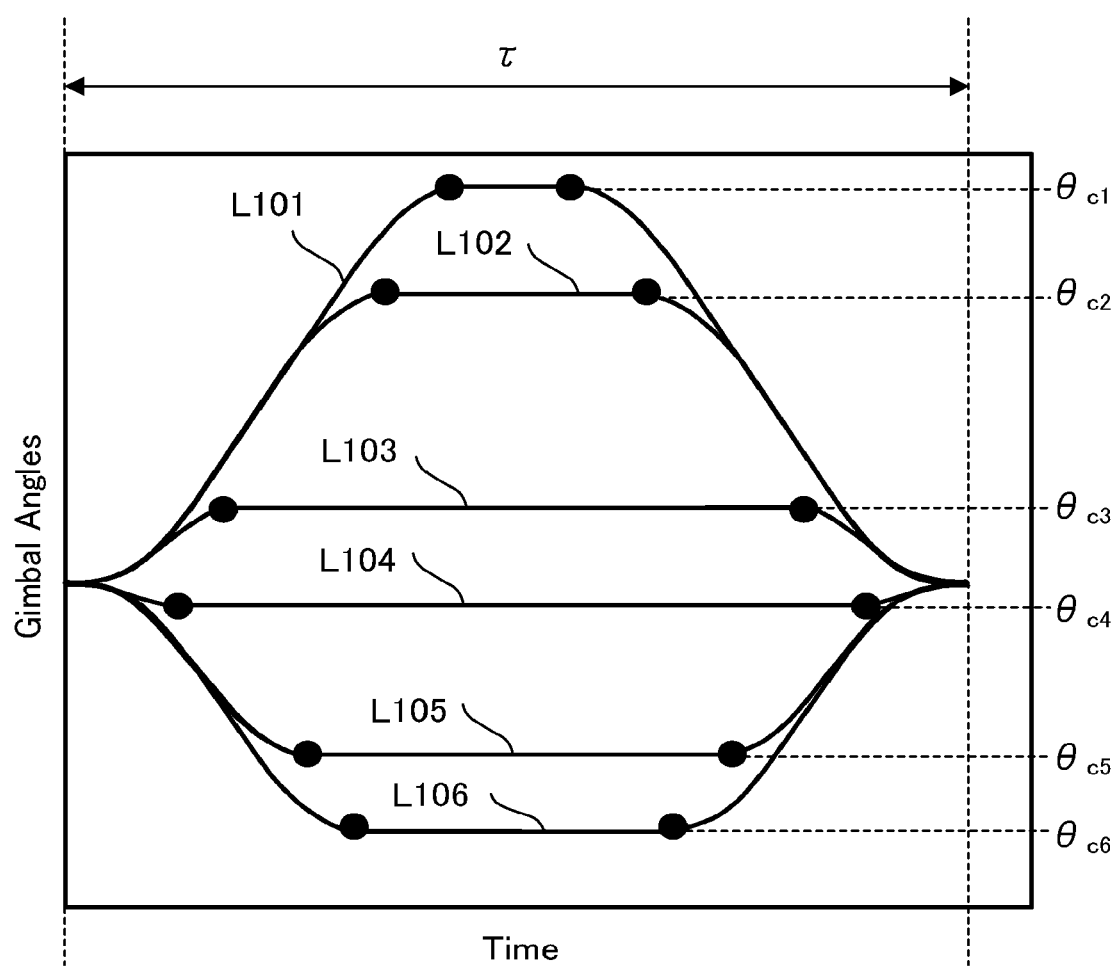
FIG. 9 is a drawing illustrating gimbal angle trajectories calculated by calculation processing according to Embodiment 1.

FIG. 8 illustrates an example of the gimbal angle trajectory calculated by the conventional trajectory calculation method. In FIG. 8, the trajectories of the gimbal angles of six CMGs 111 are illustrated, and the times of both ends of the fixed interval are the same for all the CMGs 111. In contrast, FIG. 9 illustrates an example of the gimbal angle trajectories obtained by the calculation processing of the gimbal angle trajectory calculator 2132 in the present embodiment. The periods of the acceleration interval and the deceleration interval of the gimbal angle trajectory differ for each of the CMGs 111, and the times at both ends of the fixed interval differ for each of the CMGs 111. These differences are due to driving of the gimbals such that the periods of the acceleration interval and the deceleration interval are minimized for each of the CMGs 111.

Figure 10A:
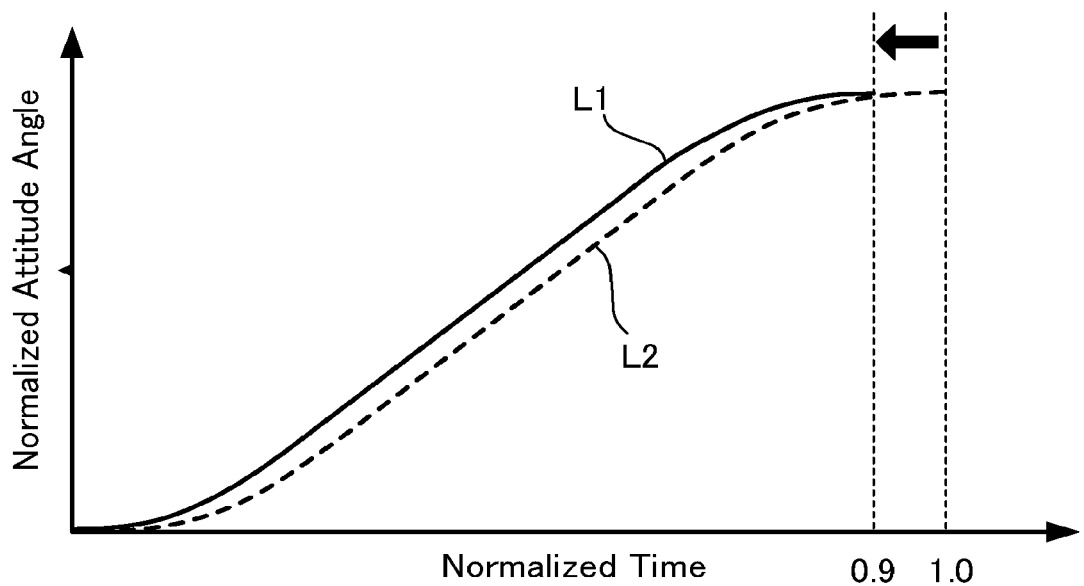
FIG. 10A is a drawing illustrating a time history of an attitude angle of the satellite.

FIG. 10A illustrates a comparison of time histories of the attitude angle obtained by calculating the gimbal angle trajectory, and performing the attitude change, using the methods of the conventional example and the present embodiment. The solid line L1 indicates the attitude angle history of the present disclosure, and the dashed line L2 indicates the attitude angle history of the conventional example. Upon comparison with the conventional example, attitude angle rises quickly in the case of the present disclosure, and the attitude change period can be decreased by 10%.

Figure 10B:
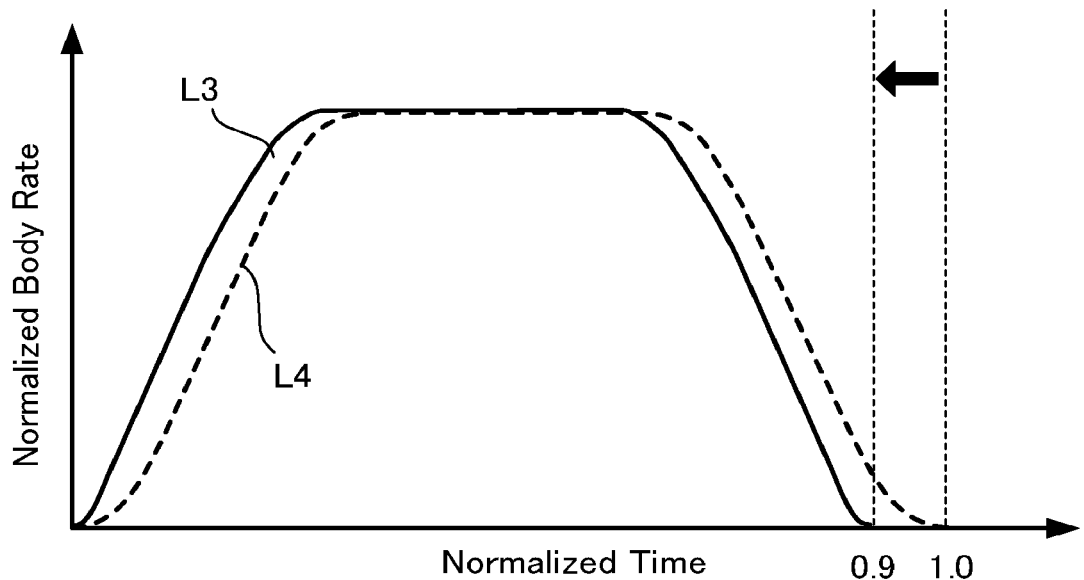
FIG. 10B is a drawing illustrating a time history of an attitude angular velocity of the satellite.

FIG. 10B illustrates a comparison of time histories of the attitude angular velocity (body rate) of the artificial satellite 11 using the methods of the conventional example and the present embodiment. The solid line L3 indicates the history of the attitude angular velocity of the present embodiment, and the dashed line L4 indicates the history of the attitude angular velocity of the conventional example. Upon comparison between both examples, the maximum attitude angular velocity is understood to be reached more quickly in the case of the present embodiment than in the case of the conventional example. This effect is due to the characteristic of the present embodiment that is the use of the specific driving capacity of each gimbal up to the upper limit, and the minimization of the acceleration interval.

Figure 11:
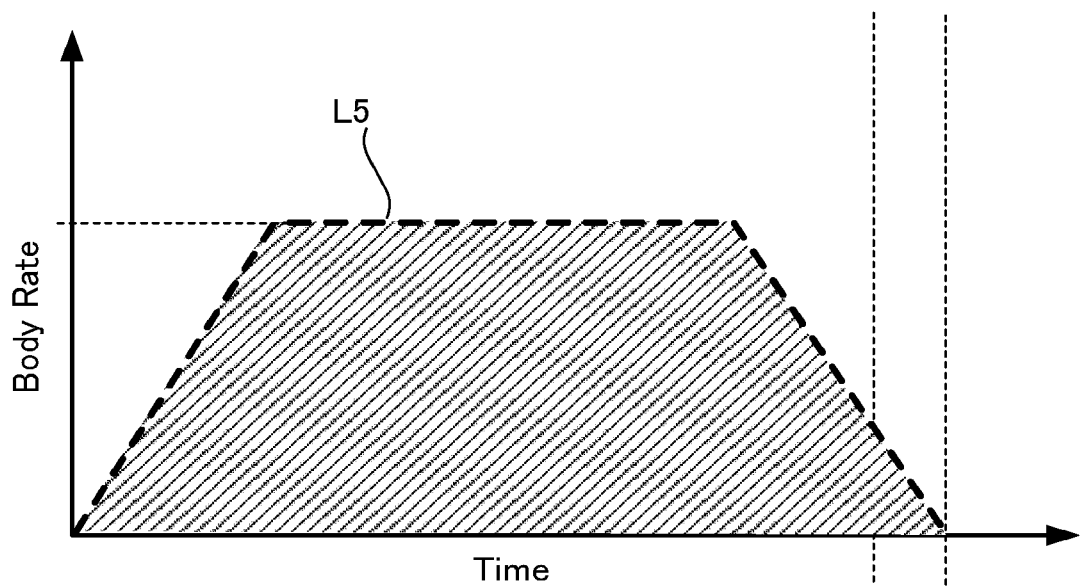
FIG. 11 illustrates a time history of an attitude angular velocity by attitude control.
Figure 11:
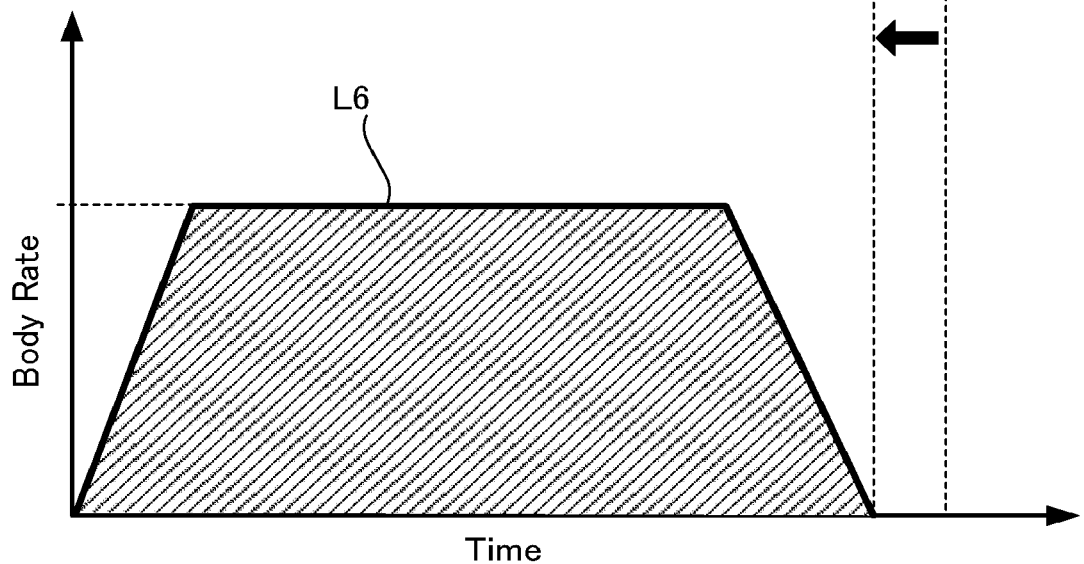

FIG. 11 schematically illustrates differences in the histories of the attitude angular velocity of the present embodiment and the conventional example illustrated in FIG. 10B. The dashed line L5 of the upper drawing indicates schematically the attitude angular velocity of the conventional example, and the solid line L6 of the lower drawing indicates schematically the attitude angular velocity of the present disclosure.

The attitude angle is obtained by integration of the attitude angular velocity over time. Therefore the area of the trapezoid surrounded by the attitude angular velocity plot and the time axis indicates the attitude change angle. Since the area of the trapezoid surrounded by the dashed line L5 and the time axis and the area of the trapezoid surrounded by the solid line L6 and the time axis are the same, the attitude angle changes only by the same angles. However, the period from zero until the maximum value of the attitude angular velocity and the period from the maximum value to zero of the attitude angular velocity decreases for the solid line L6, and thus the period required for the attitude change is shortened in comparison to the conventional example.

Thus the attitude control system 1 configured as in Embodiment 1 has the remarkable effect of allowing changing the attitude to the target value in a short period without imposing a calculation burden on the artificial satellite 11.

As described above, in the attitude control system 1 according to the present embodiment, the gimbal angle trajectory calculator 2132 of the ground station 21 on the basis of the gimbal angle $\theta_{0i}$ at the start time of the attitude change and the gimbal angle $\theta_{ci}$ at the fixed interval, calculates the gimbal angle trajectory having a minimized period of the acceleration interval within the range satisfying the driving restrictions of the gimbals, and also on the basis of the gimbal angle $\theta_{ci}$ of the fixed interval and the gimbal angle $\theta_{fi}$ at the completion time of the attitude change, calculates the gimbal angle trajectory having a minimized period of the deceleration interval within the range satisfying the driving restrictions of the gimbals. Then the obtained $\theta_{0i}$, $\theta_{ci}$, $\theta_{fi}$, and $\tau$ as gimbal angle trajectory parameters are transmitted to the artificial satellite 11 via the ground station transceiver 215, and the CMGs 111 are controlled on the basis of the gimbal angle trajectory parameters. Such configuration enables changing of the attitude of the artificial satellite 11 to the target value in a short period without imposing a calculation burden on the artificial satellite 11.

Further, although an attitude control system is described in the present embodiment that includes the artificial satellite 11 and the ground station 21, similar attitude control may be executed by an attitude control device mounted on the artificial satellite 11. In this case, the artificial satellite 11 is equipped with a plurality of the CMGs 111, the attitude angle-angular velocity sensor 112, the satellite processor 113, and the satellite memory 114. The satellite processor 113 functions as each of the functional units that are the attitude boundary condition setter 2131, the gimbal angle trajectory calculator 2132, the attitude trajectory calculator 1132, the attitude controller 1133, the steering unit 1134, and the gimbal controller 1135.

The difference between the attitude control device mounted on this artificial satellite 11 and the attitude control system 1 including the artificial satellite 11 and the ground station 21 of the present embodiment is that the target values of the gimbal angle and angular velocity calculated by the gimbal angle trajectory calculator 2132 can be used by the artificial satellite 11, and thus the gimbal angle trajectory re-calculator 1131 is unnecessary.

That is, from the target values of the gimbal angle and angular velocity calculated by the gimbal angle trajectory calculator 2132, the attitude trajectory calculator 1132 calculates the target values of the satellite attitude angle and angular velocity, and calculates the feedback attitude control torque. The steering unit 1134 and the gimbal controller 1135, in the aforementioned manner, calculate the feedback gimbal angle and angular velocity, and calculate the gimbal angle and angular velocity command values. Due to configuration in this manner, the attitude control device mounted on the artificial satellite 11 can use the capacity of the gimbals with high efficiency to perform attitude control in a short period.

Embodiment 2

Figure 12:
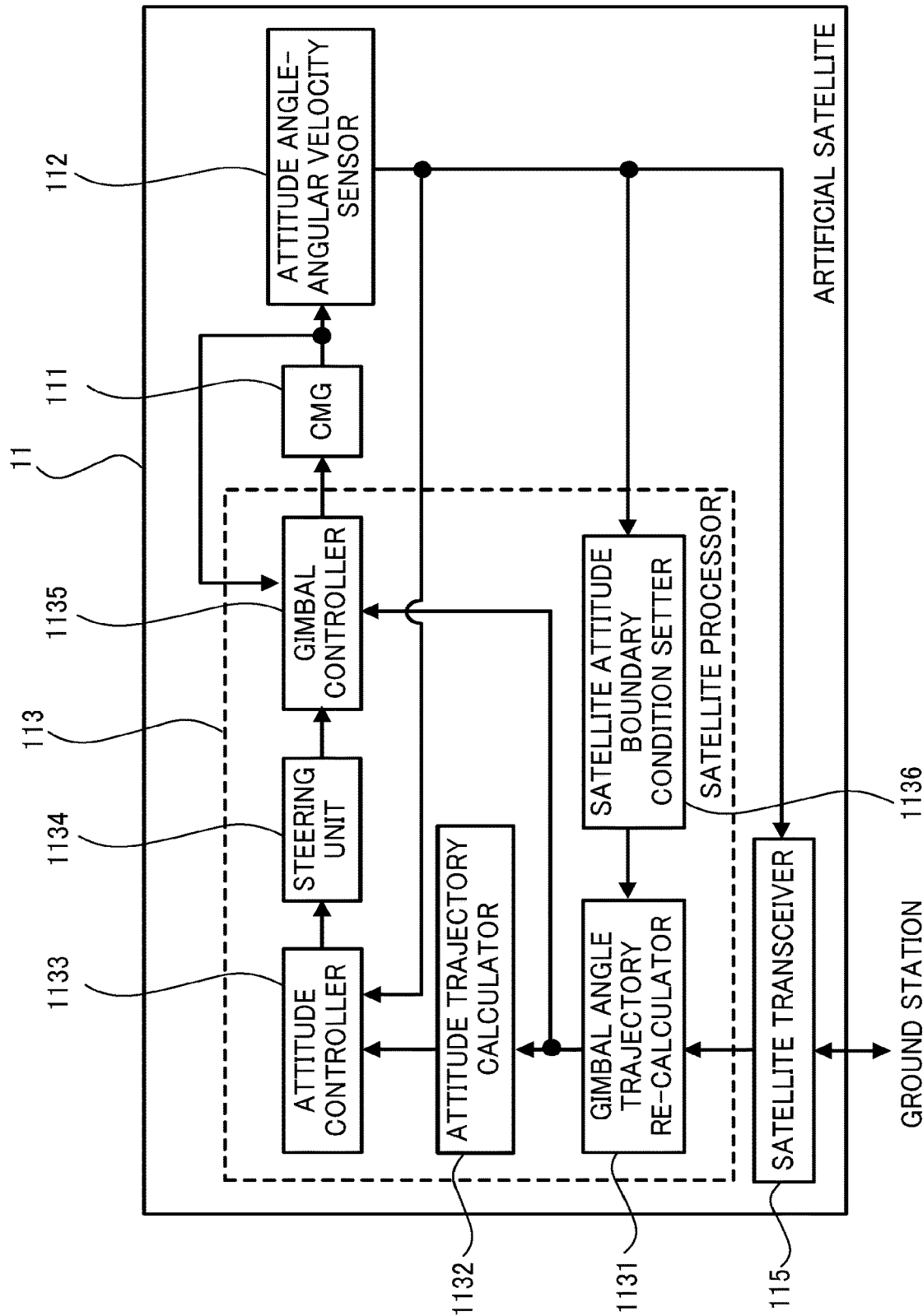
FIG. 12 is a functional block diagram illustrating parts of an artificial satellite that relate to attitude control according to Embodiment 2 of the present disclosure.

The attitude control system 1 according to Embodiment 2 of the present disclosure has a configuration similar to the configuration of Embodiment 1, although a part of the processing of the satellite processor 113 is different. FIG. 12 illustrates a functional block diagram of the artificial satellite 11 according to Embodiment 2.

The satellite processor 113 according to the present embodiment, in addition to the functions achieved by the satellite processor 113 according to Embodiment 1, further includes a satellite attitude boundary condition setter 1136. The gimbal angle trajectory re-calculator 1131, using the boundary conditions inputted from the satellite attitude boundary condition setter 1136, performs iterative calculation in the same manner as the gimbal angle trajectory calculator 2132 of the ground station 21.

In the present embodiment, due to arrangement of the satellite attitude boundary condition setter 1136 at the artificial satellite 11, the boundary conditions can be set on the basis of the position, velocity, attitude angle, and angular velocity of the artificial satellite 11 obtained at various times by the artificial satellite 11. Due to planning of the gimbal angle trajectory on the basis of such boundary conditions, increasingly high accuracy is possible in the attitude control of the artificial satellite 11.

Operation of the attitude control system 1 configured in the above-described manner is explained below. The attitude angle and angular velocity of the artificial satellite 11 output from the attitude angle-angular velocity sensor 112 of the artificial satellite 11 and the measurement values of position and velocity output from other sensors are transmitted to the ground station 21 via the satellite transceiver 115.

Then the ground station 21 executes processing similar to the processing of Embodiment 1 and transmits from the ground station transceiver 215 to the artificial satellite 11 the gimbal angle trajectory parameters obtained by calculation by the gimbal angle trajectory calculator 2132.

Using the satellite attitude boundary condition setter 1136, the boundary conditions of the attitude change are set in a manner similar to that of the attitude boundary condition setter 2131 of the ground station 21. Here, due to time differences between the clocks of the ground station 21 and the artificial satellite 11, and/or due to mismatching between the trajectory determination results of the ground station 21 and the artificial satellite 11, a slight mismatch occurs between the boundary conditions output from the attitude boundary condition setter 2131 and the boundary conditions output from the satellite attitude boundary condition setter 1136. The boundary conditions set by the satellite attitude boundary condition setter 1136 are output to the gimbal angle trajectory re-calculator 1131.

Further, the gimbal angle trajectory parameters received by the satellite transceiver 115 are also passed to the gimbal angle trajectory re-calculator 1131. The gimbal angle trajectory re-calculator 1131 uses the gimbal angle trajectory parameters sent from the ground station 21 as initial values to execute the processing to re-calculate the gimbal angle trajectory so as to satisfy the boundary conditions set by the satellite attitude boundary condition setter 1136. The target values of the gimbal angle and angular velocity obtained by the gimbal angle trajectory re-calculator 1131 are used for control of the artificial satellite 11 and the CMGs 111 in the same manner as in Embodiment 1.

In the attitude control system 1 according to the present embodiment as described above, the gimbal angle trajectory re-calculator 1131 of the artificial satellite 11 uses the gimbal angle trajectory parameters calculated at the ground side as initial values to recalculate the gimbal angle trajectory that satisfies the boundary conditions set by the satellite attitude boundary condition setter 1136 of the artificial satellite 11. Thus a suitable gimbal angle trajectory can be obtained using a lower number of iterations, and the attitude change that satisfies the boundary conditions set by the artificial satellite 11 can be achieved in a short period.

Embodiment 3

In Embodiment 1, the end edge times of the gimbal angle trajectories of the CMGs 111 are assumed to be the same. However, depending on the mission of the artificial satellite 11, an adjustment period after the completion of the attitude change is required to be shortened as much as possible. In such a case allowing dispersing of the end edge times of various gimbal angle trajectories, rather than making the end edge times of the gimbal angle trajectories the same, is advantageous for shortening the adjustment period.

Figure 13:
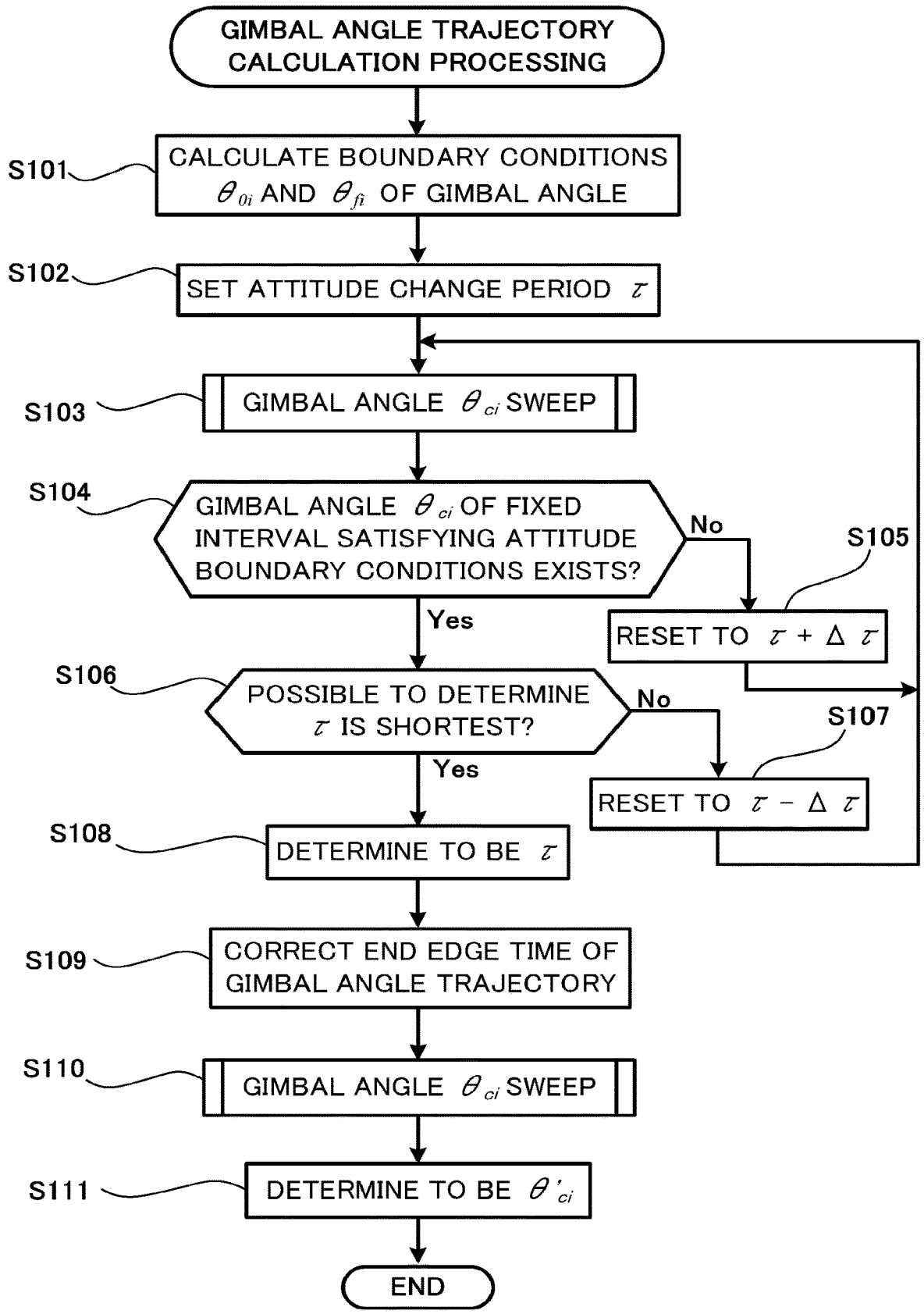
FIG. 13 is a flowchart illustrating gimbal angle trajectory calculation processing according to Embodiment 3 of the present disclosure.

FIG. 13 is a flowchart illustrating gimbal angle trajectory calculation processing according to Embodiment 3. In Embodiment 3, after execution of gimbal angle trajectory calculation processing similar to that of Embodiment 1 up to step S108, the gimbal angle trajectory calculator 2132, in accordance with the magnitude of the gimbal angle $\theta_{ci}$ of the fixed interval, modifies an end edge time of each of the gimbal angle trajectories as in the following Formula (13) (step S109).

Formula (13)

$$t_{fi} = \tau + \delta t_i \quad (13)$$

Here, $\tau$ is the attitude change period obtained by the method of Embodiment 1, and $\delta t_i$ is the modification amount of the end edge time of the gimbal angle trajectory of the i-th CMG 111. During determination of the modification amount $\delta t_i$, a maximum modification amount $\delta t_i$ is determined such that $\delta t_i > 0$ for the CMG 111 having the largest gimbal angle of the fixed interval obtained by the method of Embodiment 1, and a minimum modification amount $\delta t_i$ is determined such that $\delta t_i < 0$ for the CMG 111 having the smallest gimbal angle of the fixed interval. For the other CMGs 111, in accordance with the magnitude of the gimbal angle of the fixed interval, the determination is made by linear interpolation between the aforementioned maximum modification amount and minimum modification amount values.

The gimbal angle trajectory calculator 2132 fixes the end edge time of the gimbal angle trajectory of each CMG 111 at the time determined by the aforementioned method, and on the basis of such set times, re-sweeps the gimbal angle $\theta_{ci}$ of the fixed interval (step S110). Specifically, in the same manner as the processing illustrated in FIG. 7, iterative calculation is performed again so as to satisfy the boundary conditions of the attitude change. The gimbal angle of the fixed interval of each gimbal angle trajectory obtained in this manner is determined to be $\theta'_{ci}$ (step S111).

The end edge times $t_{fi}$ of gimbal angle trajectories obtained in the aforementioned manner are appended to the gimbal angle trajectory parameters and are transmitted to the ground station 21. For example, in the case in which the count of mounted CMGs 111 is four, a total of 20 variables are transmitted as gimbal angle trajectory parameters, that is, thirteen variables that are $\tau$, $\theta_{01}$, $\theta'_{c1}$, $\theta_{f1}$, $\theta_{02}$, $\theta'_{c2}$, $\theta_{f2}$, $\theta_{03}$, $\theta'_{c3}$, $\theta_{f3}$, $\theta_{04}$, $\theta'_{c4}$, and $\theta_{f4}$, four variables that are $t_{f1}$, $t_{f2}$, $t_{f3}$, and $t_{f4}$, and three variables that are the upper limit values of the gimbal angular velocity, the gimbal angular acceleration, and the gimbal angular jerk.

As described above, in the attitude control system 1 according to the present embodiment, the gimbal angle trajectory calculator 2132 determines the end edge time of each gimbal angle trajectory in accordance with the magnitude of the gimbal angle of the fixed interval, and calculates the gimbal angle trajectory so as to satisfy the attitude angle and the attitude angular velocity at the start time and the completion time of the attitude change. Thus the adjustment period required after completion of the attitude change of the artificial satellite 11 can be shortened.

For the present disclosure in this manner, in the attitude control system for performing attitude control of the artificial satellite using each of a plurality of control moment gyros, boundary conditions are set for the attitude angle and the attitude angular velocity at the start time and the completion time of the attitude change, and the gimbal angle trajectory is calculated by using as prerequisites (i) satisfying the set boundary conditions, and (ii) setting for a gimbal of each of the control moment gyros the acceleration interval in which the driving capacity of the gimbal of the control moment gyro is used to accelerate the rotation of the artificial satellite, the fixed interval in which the gimbal angle is fixed, and the rotation of the artificial satellite is constant, and the deceleration interval in which the driving capacity of the gimbal of the control moment gyro is used to decelerate the rotation of the artificial satellite. Such configuration enables reduction of the calculation load of the calculator mounted on the artificial satellite, and enables achievement of the attitude change in a short period.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

For example, in the aforementioned embodiments, the satellite processor 113 operates as the functional units that are the gimbal angle trajectory re-calculator 1131, the attitude trajectory calculator 1132, the attitude controller 1133, the steering unit 1134, the gimbal controller 1135, and the satellite attitude boundary condition setter 1136, and the ground station processor 213 functions as the attitude boundary condition setter 2131 and the gimbal angle trajectory calculator 2132; however, all or part of these functional units may be achieved by hardware other than a processor. For example, all or part of the aforementioned functional units may be achieved by a stand-alone circuit, a composite circuit, a parallel-programmed processor, an ASIC, an FPGA, or a combination of such.

Further, by causing execution by an existing computer of the programs for the processing executed by the satellite processor 113 and the ground station processor 213, such a computer can be made to function as the calculation processors of the artificial satellite 11 and the ground station 21 according to the present disclosure.

Any method may be used for distribution of such a program, and for example, the program may be stored in a computer-readable recording medium such as a compact disc read-only memory (CD-ROM), a digital versatile disc (DVD), a magneto-optical (MO) disc, a memory card, or the like, and the computer-readable recording medium storing the program may be distributed through a communication network such as the Internet.

This application claims the benefit of Japanese Patent Application No. 2016-176346, filed on Sep. 9, 2016, the entire disclosure of which is incorporated by reference herein.

REFERENCE SIGNS LIST

1 Attitude control system
11 Artificial satellite
111 CMG
112 Attitude angle-angular velocity sensor
113 Satellite processor
114 Satellite memory
115 Satellite transceiver
21 Ground station
213 Ground station processor
214 Ground station memory
215 Ground station transceiver
1111 Wheel
1131 Gimbal angle trajectory re-calculator
1132 Attitude trajectory calculator
1133 Attitude controller
1134 Steering unit
1135 Gimbal controller
1136 Satellite attitude boundary condition setter
2131 Attitude boundary condition setter
2132 Gimbal angle trajectory calculator

The invention claimed is:

1. An artificial satellite for performing an attitude change thereof by each of a plurality of control moment gyros, the artificial satellite comprising:
a receiver to receive gimbal angle trajectory parameters indicating a gimbal angle trajectory of each of the control moment gyros calculated by using as prerequisites (i) satisfying boundary conditions of attitude angle and attitude angular velocity of a start time and a completion time of the attitude change of the artificial satellite, and (ii) setting for a gimbal of each of the control moment gyros:
an acceleration interval in which a driving capacity of the gimbal is used to accelerate rotation of the artificial satellite,
a fixed interval in which a gimbal angle of the gimbal is fixed, and the rotation of the artificial satellite is constant, and
a deceleration interval in which the driving capacity of the gimbal is used to decelerate the rotation of the artificial satellite; and
a controller to reproduce the gimbal angle trajectory of each of the control moment gyros from the prerequisites based on the received gimbal angle trajectory parameters, and to control the gimbal of the control moment gyro in accordance with the reproduced gimbal angle trajectory.

2. The artificial satellite according to claim 1, wherein, for the gimbal of each of the control moment gyros, the driving capacity is a rated capacity that specifies an upper limit of at least one of a gimbal angular velocity, a gimbal angular acceleration, or a gimbal angular jerk.

3. The artificial satellite according to claim 1, wherein, for the gimbal of each of the control moment gyros, the driving capacity is a value obtained by multiplication of a rated capacity by a predetermined proportion, the rated capacity specifying an upper limit of at least one of a gimbal angular velocity, a gimbal angular acceleration, or a gimbal angular jerk.

4. The artificial satellite according to claim 1, wherein the gimbal angle trajectory calculator uses as the prerequisites setting of the acceleration interval and the deceleration interval determined by one pattern of three patterns that are:
a first driving pattern in which the driving capacity contributes to the gimbal angular velocity, the gimbal angular acceleration, and the gimbal angular jerk,
a second driving pattern in which the driving capacity contributes to the gimbal angular acceleration and the gimbal angular jerk, and
a third driving pattern in which the driving capacity contributes to the gimbal angular jerk.

5. The artificial satellite according to claim 4, wherein the gimbal angle trajectory calculator selects one pattern from the three patterns in accordance with a magnitude of a difference between the gimbal angle at the start time and a fixed gimbal angle of the fixed interval.

6. The artificial satellite according to claim 1, wherein the gimbal angle trajectory calculator (i) determines an end edge time of the gimbal angle trajectory of each of the gimbals in accordance with a magnitude of the gimbal angle of the fixed interval, and (ii) determines the gimbal angle trajectory so as to satisfy the attitude angle and the attitude angular velocity of the start time and the completion time of the attitude change.

7. An attitude control system for performing attitude control of an artificial satellite, the attitude control system comprising:
the artificial satellite to change attitude by each of a plurality of control moment gyros; and
a ground station to transmit information for attitude control to the artificial satellite,
wherein the ground station comprises
an attitude boundary condition setter to set boundary conditions of an attitude angle and an attitude angular velocity of a start time and a completion time of an attitude change of the artificial satellite,
a gimbal angle trajectory calculator to calculate a gimbal angle trajectory of each of the control moment gyros by using as prerequisites (i) satisfying the boundary conditions set by the attitude boundary condition setter, and (ii) setting for a gimbal of each of the control moment gyros: an acceleration interval in which a driving capacity of the gimbal is used to accelerate rotation of the artificial satellite, a fixed interval in which a gimbal angle of the gimbal is fixed, and the rotation of the artificial satellite is constant, and a deceleration interval in which the driving capacity of the gimbal is used to decelerate the rotation of the artificial satellite, and to calculate gimbal angle trajectory parameters indicating the gimbal angle trajectory, and a transmitter to transmit the gimbal angle trajectory parameters, and the artificial satellite comprises a receiver to receive the gimbal angle trajectory parameters, and a controller to reproduce the gimbal angle trajectory of each of the control moment gyros from the prerequisites based on the received gimbal angle trajectory parameters, and to control the gimbal of the control moment gyro in accordance with the reproduced gimbal angle trajectory.

8. The attitude control system according to claim 7, wherein the gimbal angle trajectory calculator uses as the prerequisites setting of the acceleration interval and the deceleration interval determined by one pattern of three patterns that are:

a first driving pattern in which the driving capacity contributes to the gimbal angular velocity, the gimbal angular acceleration, and the gimbal angular jerk, a second driving pattern in which the driving capacity contributes to the gimbal angular acceleration and the gimbal angular jerk, and a third driving pattern in which the driving capacity contributes to the gimbal angular jerk.

9. The attitude control system according to claim 8, wherein the gimbal angle trajectory calculator selects one pattern from the three patterns in accordance with a magnitude of a difference between the gimbal angle at the start time and a fixed gimbal angle of the fixed interval.

10. The attitude control system according to claim 7, wherein, for the gimbal of each of the control moment gyros, the driving capacity is a rated capacity.

11. The attitude control system according to claim 7, wherein, for the gimbal of each of the control moment gyros, the driving capacity is a value obtained by multiplication of a rated capacity by a predetermined proportion.

12. The attitude control system according to claim 10, wherein the transmitter transmits information about the driving capacity, the receiver receives the information about the driving capacity, and the controller reproduces the gimbal angle trajectory by using the driving capacity and the gimbal angle trajectory parameters received by the receiver.

13. The attitude control system according to claim 12, wherein the artificial satellite further comprises a satellite attitude boundary condition setter to set satellite attitude boundary conditions based on information measured at various times, the information including a position, a velocity, the attitude angle, and the attitude angular velocity of the artificial satellite, and the controller (i) reproduces the gimbal angle trajectory based on the driving capacity and the gimbal angle trajectory parameters that are received from the ground station, and (ii) calculates the gimbal angle trajectory satisfying the satellite attitude boundary conditions by performing iterative calculation of the reproduced gimbal angle trajectory by using the gimbal angle trajectory parameters as initial values.

14. The attitude control system according to claim 7, wherein the gimbal angle trajectory calculator (i) determines an end edge time of the gimbal angle trajectory of each of the gimbals in accordance with a magnitude of the gimbal angle of the fixed interval, and (ii) determines the gimbal angle trajectory so as to satisfy the attitude angle and the attitude angular velocity of the start time and the completion time of the attitude change.

15. An attitude control method for performing attitude control of an artificial satellite using each of a plurality of control moment gyros, the method comprising:

an attitude boundary conditions setting step of setting boundary conditions of an attitude angle and an attitude angular velocity of a start time and a completion time of an attitude change of the artificial satellite; and a gimbal angle trajectory calculating step of calculating a gimbal angle trajectory of each of the control moment gyros by using as prerequisites (i) satisfying the boundary conditions set in the attitude boundary conditions setting step, and (ii) setting for a gimbal of each of the control moment gyros:

an acceleration interval in which a driving capacity of the gimbal is used to accelerate rotation of the artificial satellite, a fixed interval in which a gimbal angle of the gimbal is fixed, and the rotation of the artificial satellite is constant, and a deceleration interval in which the driving capacity of the gimbal is used to decelerate the rotation of the artificial satellite.

16. The artificial satellite according to claim 1, wherein, for the gimbal of each of the control moment gyros, the driving capacity is a rated capacity.

17. The artificial satellite according to claim 1, wherein, for the gimbal of each of the control moment gyros, the driving capacity is a value obtained by multiplication of a rated capacity by a predetermined proportion.

18. The artificial satellite according to claim 16, wherein the gimbal angle trajectory calculator uses as the prerequisites setting of the acceleration interval and the deceleration interval determined by one pattern of three patterns that are:

a first driving pattern in which the driving capacity contributes to the gimbal angular velocity, the gimbal angular acceleration, and the gimbal angular jerk, a second driving pattern in which the driving capacity contributes to the gimbal angular acceleration and the gimbal angular jerk, and a third driving pattern in which the driving capacity contributes to the gimbal angular jerk.

19. The artificial satellite according to claim 17, wherein the gimbal angle trajectory calculator uses as the prerequisites setting of the acceleration interval and the deceleration interval determined by one pattern of three patterns that are:

a first driving pattern in which the driving capacity contributes to the gimbal angular velocity, the gimbal angular acceleration, and the gimbal angular jerk, a second driving pattern in which the driving capacity contributes to the gimbal angular acceleration and the gimbal angular jerk, and a third driving pattern in which the driving capacity contributes to the gimbal angular jerk.

\* \* \* \* \*